US012807886B2

United States Patent
(12) United States Patent
Akah et al.

(10) Patent No.: US 12,807,886 B2
(45) Date of Patent: Nov. 24, 2026

(54) RED MUD AND ZSM-5 ZEOLITE FOR SIMULTANEOUS DEHALOGENATION AND CONVERSION OF PLASTIC DERIVED OIL TO FUELS AND CHEMICALS

(71) Applicant: Saudi Arabian Oil Company, Dhahran (SA)

(72) Inventors: Aaron Chi Akah, Dhahran (SA); Noor Nasser Al-Mana, Al Khobar (SA); Mohammed Z. Al-Bahar, Dhahran (SA); Rami A. Bamagain, Khobar (SA); Bandar A. Fadhel, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 184 days.

(21) Appl. No.: 18/903,365

(22) Filed: Oct. 1, 2024

(65) Prior Publication Data

US 2026/0092220 A1 Apr. 2, 2026

(51) Int. Cl.

*C10G 11/18* (2006.01)
*B01J 29/46* (2006.01)
(Continued)

(52) U.S. Cl.

CPC ............... *C10G 11/18* (2013.01); *B01J 29/46* (2013.01); *B01J 35/615* (2024.01); *B01J 35/647* (2024.01);
(Continued)

(58) Field of Classification Search

CPC ............ C10G 11/18; C10G 2300/1003; C10G 2300/70; C10G 2400/04; C10G 2400/08; B01J 29/46; B01J 35/615; B01J 35/647; B01J 35/651; B01J 37/0045; B01J 37/04; B01J 37/08

See application file for complete search history.

(56) References Cited

U.S. PATENT DOCUMENTS 11,534,746 B2 * 12/2022 Agblevor ................ B01J 21/04
11,939,533 B2 3/2024 Akah
(Continued)

FOREIGN PATENT DOCUMENTS

EP 4379020 A1 6/2024
WO 2023091908 A1 5/2023
(Continued)

OTHER PUBLICATIONS

Ahmed et al., "Transforming red mud into an efficient Acid-Base catalyst by hybridization with mesoporous ZSM-5 for Co-pyrolysis of biomass and plastics", Chemical Engineering Journal, vol. 430, 132965, 9 pages, 2022.

(Continued)

*Primary Examiner* — Ellen M Mcavoy

(74) *Attorney, Agent, or Firm* — DINSMORE & SHOHL LLP

(57) ABSTRACT

A hybrid catalyst for simultaneous dehalogenation and cracking of plastic derived oil includes a plurality of composite particles, wherein each of the composite particles includes red mud particles and ZSM-5 zeolite particles. A process for upgrading plastic derived oil includes contacting the plastic derived oil with the hybrid catalyst. A system for upgrading plastic derived oil includes an FCC reactor containing the hybrid catalyst.

19 Claims, 6 Drawing Sheets

(51) Int. Cl.

| | |
|---|---|
| ***B01J 35/61*** | (2024.01) |
| ***B01J 35/64*** | (2024.01) |
| ***B01J 37/00*** | (2006.01) |
| ***B01J 37/04*** | (2006.01) |
| ***B01J 37/08*** | (2006.01) |

(52) U.S. Cl.

CPC ......... *B01J 35/651* (2024.01); *B01J 37/0045* (2013.01); *B01J 37/04* (2013.01); *B01J 37/08* (2013.01); *C10G 2300/1003* (2013.01); *C10G 2300/70* (2013.01); *C10G 2400/04* (2013.01); *C10G 2400/08* (2013.01); *C10G 2400/20* (2013.01)

(56) References Cited

U.S. PATENT DOCUMENTS

| | | | | |
|---|---|---|---|---|
| 2019/0270939 | A1* | 9/2019 | Javeed | C10G 1/002 |
| 2019/0299491 | A1 | 10/2019 | Stanislaus et al. | |
| 2023/0211326 | A1* | 7/2023 | Wang | C10G 1/086<br>502/66 |
| 2023/0357644 | A1* | 11/2023 | Li | C10G 1/10 |
| 2025/0011653 | A1* | 1/2025 | Loiland | C10G 67/16 |
| 2025/0197725 | A1* | 6/2025 | Jo | C10G 1/10 |
| 2025/0215336 | A1 | 7/2025 | Akah et al. | |
| 2026/0078307 | A1* | 3/2026 | Akah | C10G 11/05 |
| 2026/0091378 | A1* | 4/2026 | Akah | B01J 29/18 |
| 2026/0092219 | A1* | 4/2026 | Akah | B01J 29/7007 |
| 2026/0092221 | A1* | 4/2026 | Akah | C10G 1/10 |
| 2026/0098216 | A1* | 4/2026 | Akah | C10G 1/002 |

FOREIGN PATENT DOCUMENTS

| | | | |
|---|---|---|---|
| WO | 2023095035 | A1 | 6/2023 |
| WO | 2025226440 | A1 | 10/2025 |
| WO | 2025226441 | A1 | 10/2025 |

OTHER PUBLICATIONS

Fekhar et al., "Pyrolysis of chlorine contaminated municipal plastic waste: in-situ upgrading of pyrolysis oils by Ni/ZSM-5, Ni/SAPO-11, red mud and CA(OH)2 containing catalysts", Journal of Energy Institute, vol. 92, pp. 1270-1283, 2019.

Notification of Transmittal of the International Search Report and the Written Opinion of the International Searching Authority, or the Declaration dated Jan. 16, 2026 pertaining to International application No. PCT/US2025/046593 filed Sep. 16, 2025, pp. 1-19.

Park, Ki-Bum et al. "Separate two-step and continuous two-stage pyrolysis of a waste plastic mixture to produce a chlorine-depleted oil", Energy, Nov. 11, 2021, pp. 1-12, vol. 244, Elsevier, Amsterdam, NL.

Lingaiah, N et al. "Removal of organic chlorine compounds by catalytic dehydrochlorination for the refinement of municipal waste plastic derived oil", Fuel, Oct. 1, 2001, pp. 1901-1905, vol. 80, No. 13, IPC Science and Technology Press , Guildford, GB.

* cited by examiner

RED MUD AND ZSM-5 ZEOLITE FOR SIMULTANEOUS DEHALOGENATION AND CONVERSION OF PLASTIC DERIVED OIL TO FUELS AND CHEMICALS

BACKGROUND

Field

The present disclosure generally relates to catalysts and processes for upgrading plastic derived oils, more specifically, hybrid catalysts and processes for decontaminating and converting plastic derived oils to produce greater value circular chemicals and intermediates.

Technical Background

The use of plastics in commercial and industrial applications has become prolific. The increasing use of plastics worldwide has increased the generation of waste plastic, which presents a sustainability opportunity. Plastic is a synthetic or semisynthetic organic polymer composed of mainly carbon and hydrogen. Further, plastics tend to be durable, with a slow rate of degradation, therefore, they stay in the environment for a long time and are not prone to rapid breakdown upon disposal. Pure plastics are generally insoluble in water and nontoxic. However, some additives used in plastic preparation are toxic and may leach into the environment. Examples of toxic additives include phthalates. Other typical additives include fillers, colorant, plasticizers, stabilizers, anti-oxidants, flame retardants, ultraviolet (UV) light absorbers, antistatic agents, blowing agents, lubricants used during its preparation to change its composition and properties. Development of processes for converting waste plastics into reusable materials, such as but not limited to chemical products, intermediates, or low carbon footprint fuels is continuing. Plastics pyrolyze at high temperatures and polymers can be converted back to their original monomers or smaller polymers, as gas or liquid, and can be recovered.

SUMMARY

Oils derived from waste plastics can contain compounds useful as fuel blending components or chemical feedstocks. However, the additives added to the plastic during production present challenges in effectively utilizing the recovered products from pyrolysis. Upon pyrolysis, the additives end-up in the pyrolysis products and thus require further processing to generate useful products. Additionally, the oils produced from pyrolysis of plastic waste can present a challenge due to the presence of halogen-containing compounds, such as those resulting from the presence of polyvinyl chloride (PVC) or other halogen-containing plastics. PVC is one of the most abundant plastics used for consumable goods. Waste plastic can contain from 1 weight percent (wt. %) to 5 wt. % PVC or other halogen-containing plastics. However, recycling of used PVC and other halogen-containing plastics is very difficult due to the presence of chlorine or other halogens in the structure.

Plastic derived oils have good properties and hydrocarbon constituents useful for application as fuel blending components or chemical feedstocks. However, plastic derived oils can present a processing challenge due to the presence of halogen-containing compounds (such as chlorine-containing hydrocarbon compounds) and due to the wide boiling point temperature range of the plastic derived oils, such as $C_5$ to $C_{25}$ or greater (boiling point temperatures of from 30 °C to 400 °C or even greater than 400 °C). Plastic derived oils can also include compounds with different functional groups and families of organic compounds such as but not limited to oxygenates, aromatic compounds, olefins, alkanes, other hydrocarbon compounds, or combinations of these. The direct use of plastic waste derived oil in catalytic cracking to produce circular chemicals can lead to problems downstream because of the presence of halogen-containing compounds, such as but not limited to chlorine-containing hydrocarbon compounds.

Accordingly, an ongoing need exists for catalysts and processes for decontaminating plastic derived oils and converting the plastic derived oils into greater value chemical products and intermediates, such as but not limited to light olefins ($C_2$-$C_4$ olefins), light aromatic compounds ($C_6$-$C_8$ aromatic compounds), light naphtha, low carbon footprint fuel components, other circular chemicals, or combinations of these. The present disclosure satisfies these needs by presenting a hybrid catalyst comprising red mud and ZSM-5 zeolite and disclosing processes using the hybrid catalyst for simultaneously decontaminating and converting the plastic derived oils to produce greater value chemical products and intermediates. The hybrid catalyst may comprise composite particles that each include a combination of red mud particles and ZSM-5 zeolite particles, the ZSM-5 zeolite particles cause at least a portion of the hydrocarbons in the plastic derived oil to undergo catalytic cracking to produce the greater value circular chemical products and intermediates. During cracking, the chlorine in organochlorides (and other halogens, if present) is given off as HCl, which is then captured by the metal oxides present in the red mud particles to form metal chlorides. Therefore, red mud acts as a trap for the HCl, thus preserving the active sites in the zeolite. The acid sites in the ZSM-5 zeolite also help to activate difficult-to-crack organochlorides like the olefinic, naphthenic, and aromatic organochlorides.

The present disclosure is also directed to processes for converting waste plastic or plastic derived oil to greater value chemicals and intermediates using the hybrid catalyst. In particular, the processes disclosed herein may include a single reactor conversion system configured to receive a plastic derived oil and contact the plastic derived oil with the hybrid catalyst at reaction conditions. Contact of the plastic derived oil with the hybrid catalyst causes dehalogenation of the plastic derived oil along with simultaneous conversion of at least a portion of the plastic derived oil to greater value chemicals and intermediates, which can include but are not limited to light olefins, light aromatic compounds, light naphtha, low carbon footprint fuel blending components such as low-carbon jet fuel or diesel fuel, other circular chemicals, or combinations of these.

According to one or more aspects of the present disclosure, a hybrid catalyst for upgrading plastic derived oil may comprise a plurality of composite particles, wherein each of the composite particles comprises red mud particles and ZSM-5 zeolite particles.

According to one or more aspects of the present disclosure, a process for upgrading plastic derived oil may comprise contacting the plastic derived oil with the hybrid catalyst described herein in an FCC reactor to produce an FCC effluent and a used hybrid catalyst, wherein the FCC reactor is a fluidized bed reactor and the plastic derived oil comprises halogen-containing compounds. The contacting the plastic derived oil with the hybrid catalyst at reaction conditions may cause at least a portion of the halogen-containing compounds to react to form hydrocarbons and hydrogen halides, where the hydrogen halides are adsorbed onto surfaces of the red mud particles. The contacting the plastic derived oil with the hybrid catalyst at reaction conditions may cause hydrocarbons in the plastic derived oil to undergo cracking reactions to produce the FCC effluent. The FCC effluent may have a concentration of the halogen-containing compounds less than a concentration of the halogen-containing compounds in the plastic derived oil and the FCC effluent may comprise light olefins, light naphtha, jet fuel constituents, and diesel constituents.

According to one or more aspects of the present disclosure, a system for upgrading plastic derived oil may comprise an FCC reactor containing the hybrid catalyst described herein, wherein the FCC reactor is a fluidized bed reactor configured to contact a plastic derived oil stream with the hybrid catalyst to produce an FCC effluent. The system may further comprise a fluid-solid separation unit disposed at an outlet end of the FCC reactor, wherein the fluid-solid separation unit is configured to separate the FCC effluent from a used hybrid catalyst. The system may further comprise a catalyst regenerator disposed downstream of the fluid-solid separation unit, wherein the catalyst regenerator is configured to regenerate the used hybrid catalyst to produce a regenerated hybrid catalyst.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
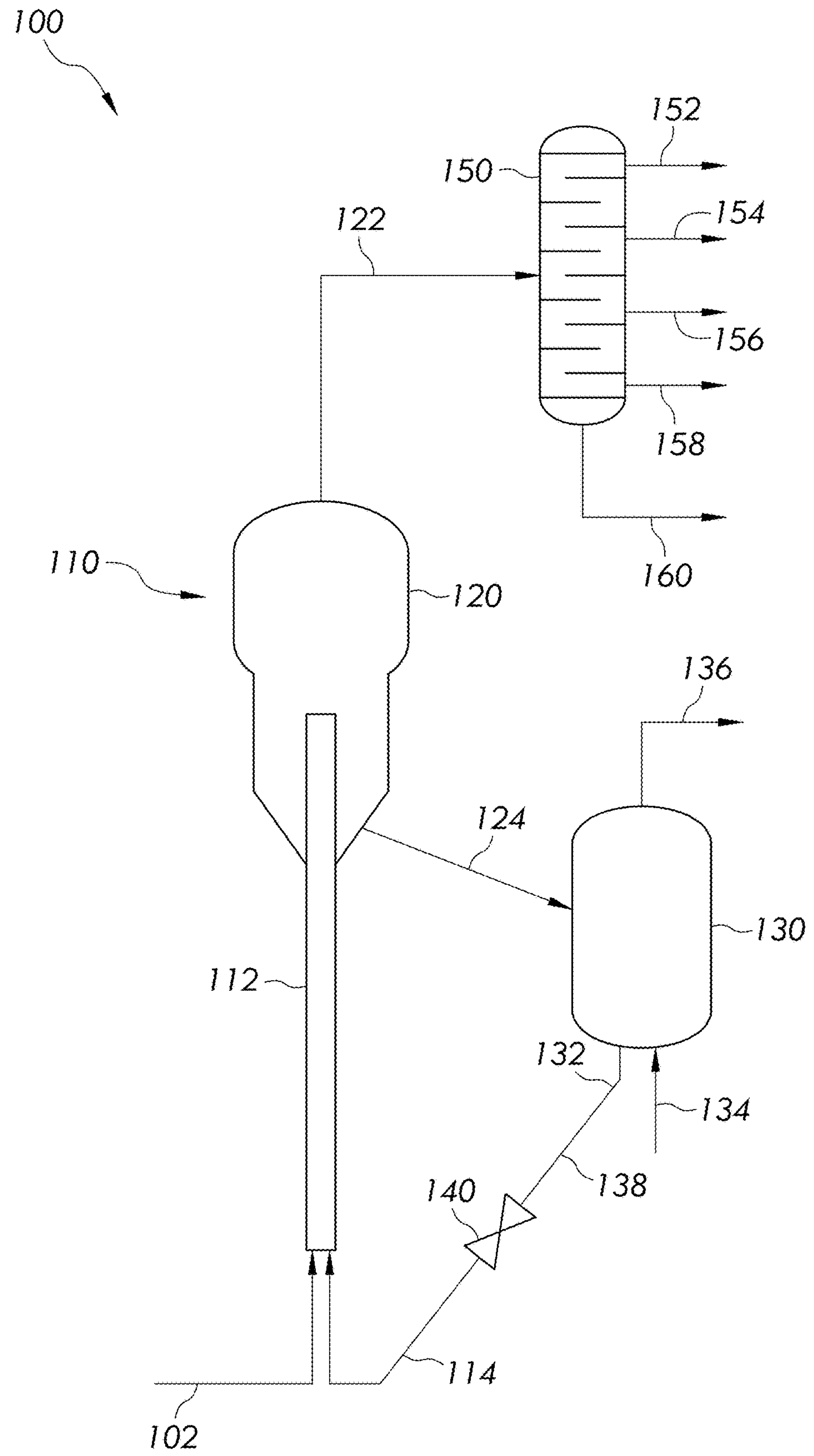
FIG. 1 schematically depicts a generalized flow diagram of a single reactor system for upgrading plastic derived oils, according to embodiments shown and described in this disclosure.
Figure 2:
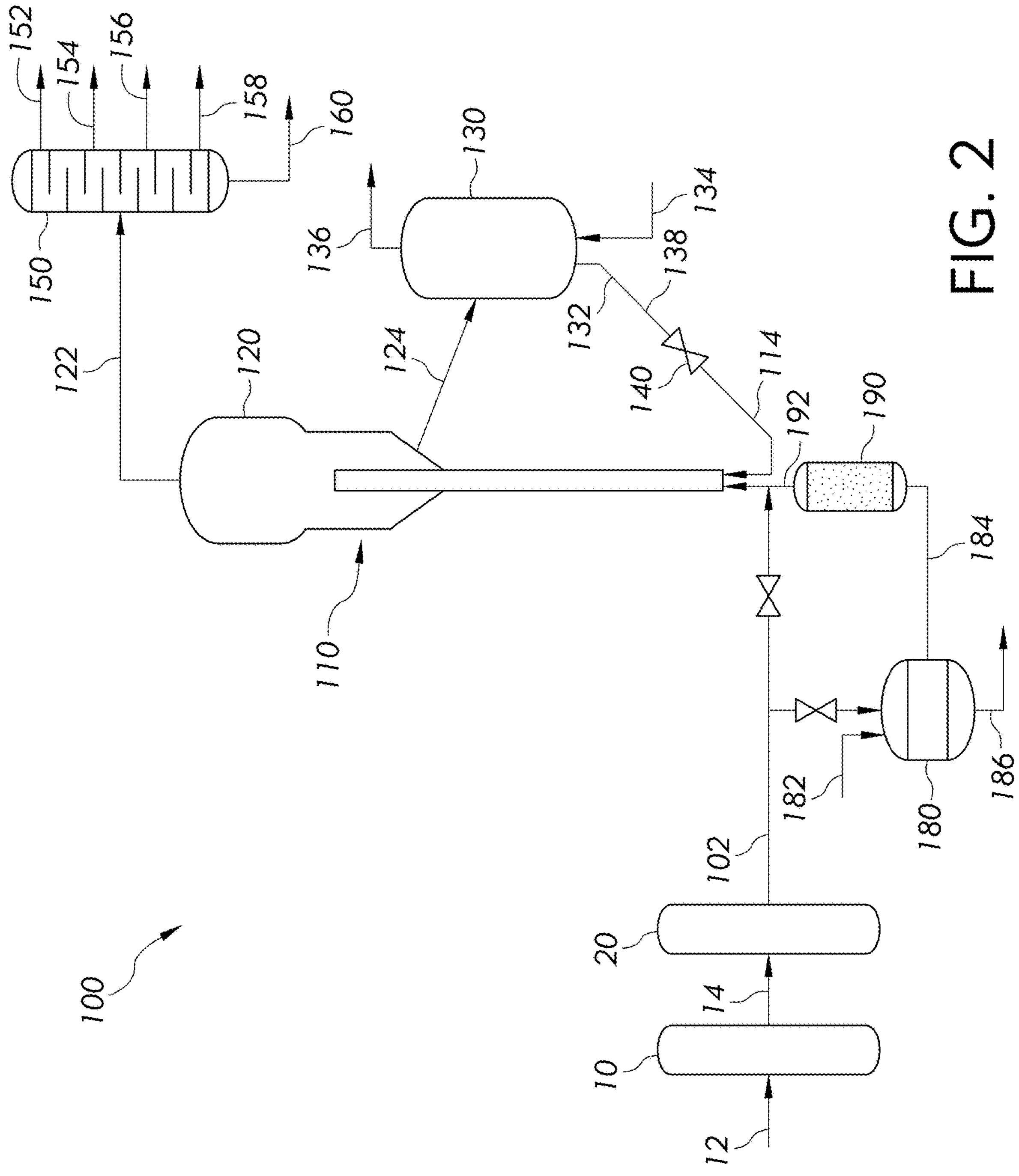
FIG. 2 schematically depicts a generalized flow diagram of a system for converting solid plastic waste to greater value circular chemicals and intermediates, where the system includes the single reactor system for upgrading plastic derived oils of FIG. 1, according to embodiments shown and described in this disclosure.
Figure 3:
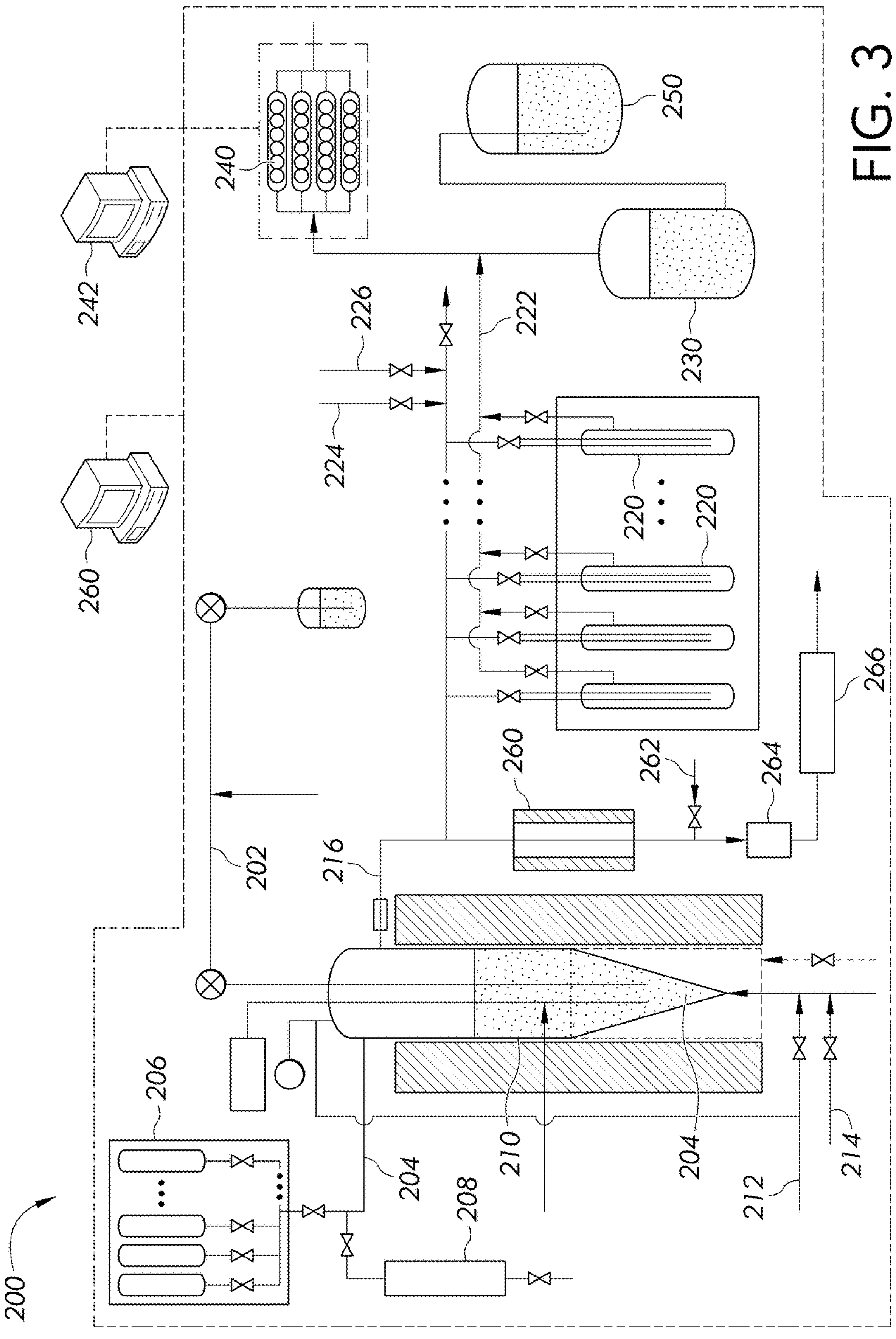
FIG. 3 schematically depicts a test reactor system for evaluating catalyst performance, according to embodiments shown and described in this disclosure.

For the purpose of describing the simplified schematic illustrations and descriptions of FIGS. 1-3, some of the numerous valves, temperature sensors, electronic controllers, and the like that may be employed and well known to those of ordinary skill in the art of certain chemical processing operations are not included. Further, accompanying components that are often included in chemical processing operations, such as, for example, air supplies, heat exchangers, surge tanks, catalyst hoppers, or other related systems are not depicted. It would be known that these components are within the spirit and scope of the present embodiments disclosed. However, operational components, such as those described in the present disclosure, may be added to the embodiments described in this disclosure.

It should further be noted that arrows in the drawings refer to process streams. However, the arrows may equivalently refer to transfer lines that may serve to transfer process streams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows that do not connect two or more system components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, may be replaced by a system inlet stream of the same material, and that a portion of a recycle stream may exit the system as a system product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

It should be understood that two or more process streams are "mixed" or "combined" when two or more lines intersect in the schematic flow diagrams of FIGS. 1-3. Mixing or combining may also include mixing by directly introducing both streams into a like reactor, separation device, or other system component. For example, it should be understood that when two streams are depicted as being combined directly prior to entering a separator or reactor, that in some embodiments the streams could equivalently be introduced into the separator or reactor and be mixed in the reactor.

Reference will now be made in greater detail to various embodiments of the present disclosure, some embodiments of which are illustrated in the accompanying drawings. Whenever possible, the same reference numerals will be used throughout the drawings to refer to the same or similar parts.

DETAILED DESCRIPTION

Embodiments of the present disclosure are directed to hybrid catalysts and processes for processing plastic derived oils with the hybrid catalysts, such as decontaminating and converting plastic derived oils, to produce greater value chemical products and intermediates. The hybrid catalysts of the present disclosure comprise a plurality of composite particles, wherein each of the composite particles comprises both red mud particles and ZSM-5 zeolite particles. Referring to FIG. 1, one embodiment of a system 100 for simultaneous dehalogenation and cracking of a plastic derived oil stream 102 is schematically depicted. The system 100 includes a fluidized catalytic cracking (FCC) system 110 having an FCC reactor 112 containing the hybrid catalyst 114, where the hybrid catalyst 114 comprises the red mud particles and the ZSM-5 zeolite particles. The FCC reactor 112 may be a fluidized bed reactor configured to contact a plastic derived oil stream 102 with the hybrid catalyst 114 to produce an FCC effluent 122. The FCC system 110 may further include a fluid-solid separation unit 120 disposed at an outlet end of the FCC reactor 112, where the fluid-solid separation unit 120 is configured to separate the FCC effluent 122 from a used hybrid catalyst 124. The FCC system 110 may further include a catalyst regenerator 130 disposed downstream of the fluid-solid separation unit, the catalyst regenerator 130 configured to regenerate the used hybrid catalyst 124 to produce a regenerated hybrid catalyst 132, which may be passed back to the FCC reactor 112 as the hybrid catalyst 114.

The hybrid catalyst of the present disclosure may be used in a process for decontaminating and upgrading plastic derived oils to produce greater value chemicals and intermediates. Referring again to FIG. 1, the processes of the present disclosure may include contacting the plastic derived oil stream 102 with the hybrid catalyst 114 in a fluidized catalytic cracking reactor 112 (FCC reactor 112) at reaction conditions to produce an FCC effluent 122 and a used hybrid catalyst 124. The FCC reactor 112 may be a fluidized bed reactor. The plastic derived oil stream 102 may comprise halogen-containing compounds. Contacting the plastic derived oil stream 102 with the hybrid catalyst 114 may cause at least a portion of the halogen-containing compounds to react to form hydrocarbons and hydrogen halides. The hydrogen halides may adsorb onto surfaces of the red mud particles of the hybrid catalyst. Additionally, contacting the plastic derived oil stream 102 with the hybrid catalyst 114 may cause hydrocarbons in the plastic derived oil stream 102 to undergo cracking conditions to produce the FCC effluent 122. The FCC effluent 122 may have a concentration of halogen-containing compounds less than a concentration of the halogen-containing compounds in the plastic derived oil stream 102. The FCC effluent 122 may comprise light olefins, light naphtha, jet fuel constituents, and diesel constituents.

As used in this disclosure, the term “catalyst” refers to any substance that increases the rate of a specific chemical reaction. Catalysts and catalyst components described in this disclosure can be utilized to promote various reactions, such as, but not limited to selective hydrogenation, ring opening, disproportionation, dealkylation, hydrodealkylation, transalkylation, catalytic cracking, aromatic cracking, dehalogenation, other chemical reactions, or combinations of these.

As used in this disclosure, the term “used catalyst” refers to catalyst that has been contacted with reactants but has not been regenerated to restore at least a portion of the catalytic activity. The term “regenerated catalyst” refers to a catalyst that has been regenerated in a regenerator or through a regeneration process to increase the catalytic activity, the temperature, or both of the regenerated catalyst.

As used in this disclosure, the term “aromatic compounds” refers to compounds having one or more aromatic ring structures. The term “light aromatic compounds” refers to compounds having an aromatic ring, with or without substitution, and from six to eight carbon atoms. The term “BTEX” refers to any combination of one or a plurality of benzene, toluene, ethylbenzene, para-xylene, meta-xylene, and ortho-xylene.

As used in this disclosure, the term “xylenes,” when used without a designation of the isomer, such as the prefix para, meta, or ortho, refers to one or more of meta-xylene, ortho-xylene, para-xylene, and mixtures of these xylene isomers.

As used in this disclosure, the terms “butenes” and “mixed butenes” refers to 1-butene, cis-2-butene, trans-2-butene, isobutene, and combinations of these. As used in this disclosure, the term “normal butenes” refers to 1-butene, cis-2-butene, trans-2-butene, and any combination thereof, but not including isobutene.

As used in this disclosure, the terms “low carbon footprint fuels” or “low carbon footprint fuel components” refers to fuels and/or fuel components derived from non-fossil origin in contrast to conventional fuels which are produced from petroleum extracted from subterranean sources. The “low carbon footprint fuels” or “low carbon footprint fuel components” are produced sustainably from municipal or organic waste, sustainable biomass, renewables, and circular $CO_2$. Production and use of the low carbon footprint fuels and fuel components result in very little or no additional $CO_2$ generated. Low carbon footprint fuels and fuel components can help to reduce greenhouse emissions and mitigate the effects of climate change.

As used in this disclosure, the term “circular chemicals” refers to chemicals that are derived from the process of recycling waste materials back to produce useful chemical products and intermediates.

As used in this disclosure, the terms “boiling point temperature”, or “boiling temperature”, or “boiling point” refer to the temperature at which a compound or composition boils at atmospheric pressure, unless otherwise stated.

As used in this disclosure, the term “initial boiling point” or “IBP” of a composition refers to the temperature at which the constituents of the composition having the lowest boiling point temperature begin to transition from the liquid phase to the vapor phase.

As used in this disclosure, the term “final boiling point” or “FBP” of a composition refers to the temperature at which the greatest boiling temperature constituents of the composition transition from the liquid phase to the vapor phase.

As used in this disclosure, the term “separation unit” refers to any separation device that at least partially separates one or more chemicals in a mixture from one another. For example, a separation unit may selectively separate different chemical species from one another, forming one or more chemical fractions. Examples of separation units include, without limitation, distillation columns, cryogenic distillation units, fractionators, flash drums, knock-out drums, knock-out pots, centrifuges, filtration devices, traps, scrubbers, expansion devices, membranes, solvent extraction devices, pressure swing adsorption units, high-pressure separators, low-pressure separators, fluid-solid separators, and the like. It should be understood that separation processes described in this disclosure may not completely separate all of one chemical consistent from all of another chemical constituent. It should be understood that the separation processes described in this disclosure “at least partially” separate different chemical components from one another, and that even if not explicitly stated, it should be understood that separation may include only partial separation. As used in this disclosure, one or more chemical constituents may be "separated" from a process stream to form a new process stream. Generally, a process stream may enter a separation unit and be divided or separated into two or more process streams of desired composition.

As used in this disclosure, the terms "upstream" and "downstream" refer to the relative positioning of unit operations with respect to the direction of flow of the process streams through the system. A first unit operation of a system is considered "upstream" of a second unit operation if process streams flowing through the system encounter the first unit operation before encountering the second unit operation. Likewise, a second unit operation is considered "downstream" of the first unit operation if the process streams flowing through the system encounter the first unit operation before encountering the second unit operation.

As used in this disclosure, passing a stream or effluent from one unit "directly" to another unit refers to passing the stream or effluent from the first unit to the second unit without passing the stream or effluent through an intervening reaction system or separation system that substantially changes the composition of the stream or effluent. Heat transfer devices, such as heat exchangers, preheaters, coolers, condensers, or other heat transfer equipment, and pressure devices, such as pumps, pressure regulators, compressors, or other pressure devices, are not considered to be intervening systems that change the composition of a stream or effluent, unless otherwise specifically stated in the present disclosure. Combining two streams or effluents together upstream of a process unit also is not considered to comprise an intervening system that changes the composition of one or both of the streams or effluents being combined. Simply dividing a stream into two streams having the same composition is also not considered to comprise an intervening system that changes the composition of the stream.

As used in this disclosure, the term "effluent" refers to a stream that is passed out of a reactor, a reaction zone, or a separator following a particular reaction or separation process. Generally, an effluent has a different composition than the stream that entered the separator, reactor, or reaction zone. It should be understood that when an effluent is passed to another system unit, only a portion of that system stream may be passed. For example, a slip stream (having the same composition) may carry some of the effluent away, meaning that only a portion of the effluent may enter the downstream system unit. The terms "reaction effluent" or "reactor effluent" are more particularly be used to refer to a stream that is passed out of a reactor or reaction zone.

It should further be understood that streams may be named for the components of the stream, and the component for which the stream is named may be the major component of the stream (such as comprising from 50 weight percent (wt. %), from 70 wt. %, from 90 wt. %, from 95 wt. %, from 99 wt. %, from 99.5 wt. %, or even from 99.9 wt. % of the contents of the stream to 100 wt. % of the contents of the stream, notwithstanding any inert gases or diluents added to the stream). It should also be understood that components of a stream are disclosed as passing from one system component to another when a stream comprising that component is disclosed as passing from that system component to another. For example, a disclosed "olefin stream" passing to a first system component or from a first system component to a second system component should be understood to equivalently disclose the "olefin compounds" passing to the first system component or passing from a first system component to a second system component.

The demand for circular chemicals, which can be used for the production of chemical intermediates used in production of polymers and plastics as well as for fuel components, is steadily increasing. Circular chemicals can include monomers, such as ethylene, propylene, butenes, benzene, xylenes, and toluene, which are produced from plastic waste and plastic derived oil. These monomers can then be used again for the production of polymers, such as polyethylene, polypropylene, and polyethylene terephthalate. They are called circular chemicals because they are derived from the process of recycling waste materials back to produce useful chemical products and intermediates. Converting plastic waste can also produce low carbon footprint fuel components, such as gasoline, jet fuels, or diesel fuels, which can provide additional sources of fuel with reduced $CO_2$ generation, compared to fuel components derived from fossil fuels extracted from subterranean sources.

As previously discussed, plastic derived oils have good properties and contain hydrocarbon constituents useful for application as chemical intermediates and fuel blending components. However, plastic derived oils can include halogen-containing compounds, such as but not limited to chloro-organic compounds, and other contaminants resulting from the types of solid waste plastic and additives included in the plastics, and the plastic derived oils can have a broad boiling point temperature range, such as from 30 °C to 400 °C, or even greater than 400 °C. Plastic derived oils can also include compounds with different functional groups and families of organic compounds, such as but not limited to oxygenates, aromatic compounds, olefins, alkanes, other hydrocarbon compounds, or combinations of these.

The direct use of plastic waste derived oils in catalytic cracking to produce chemical products, intermediates, or fuel components can lead to problems downstream because of the presence of the halogen-containing compounds. These problems can include corrosion caused by the breakdown of halogen-containing compounds, such as organic chlorides, to form hydrogen halides, such as HCl, which are corrosive and can attack refinery equipment such as pipes, valves and heat exchangers, leading to leaks, equipment failure, and costly repairs. The presence of halogen-containing compounds can also poison or damage catalysts, such as hydrocracking catalysts, used in downstream refining processes, which can reduce the efficiency of the refining process, leading to lower quality products and process inefficiencies. Halogen-containing compounds, such as organic halides, can form salts, such as but not limited to ammonium chloride ($NH_4Cl$), that can foul refinery equipment, such as pipes or heat exchangers. Halogen-containing compounds can also contaminate refined products such as gasoline and diesel fuels, resulting in product quality problems such as but not limited to engine knocking and fuel injector fouling.

Typical processes for converting plastic derived oils include multi-step processes for removing halogen-containing compounds from the plastic derived oils, such as through hydrotreating or adsorption. Once halogens are removed, the dehalogenated plastic derived oils are then converted to greater value chemicals and intermediates through cracking, hydrocracking, or other additional process. Thus, conversion of plastic derived oils to greater value products and intermediates generally requires multiple processing steps.

Further, contact of plastic derived oils with decontamination catalysts or adsorbents in conventional processes may remove only part of the halogen-containing compounds from the plastic derived oil. A substantial amount of the halogen-containing compounds in the plastic derived oil, however, remain inaccessible to the conventional catalysts or adsorbents due to being embedded within large molecules, such as waxes or other heavy components, or agglomerates of large molecules entangled together. Conventional catalysts effective at removing halogen-containing compounds do not possess the ability to efficiently crack heavy constituents of the plastic derived oil. As a result, reaction products from existing processes for converting plastic derived oils may still contain significant concentrations of halogen-containing compounds, which can cause problems, as previously discussed herein.

Thus, an ongoing need exists for more efficient processes and catalysts for converting plastic derived oils to greater value chemicals and intermediates while also decontaminating the plastic derived oils and greater value chemicals and intermediates, such as removing halogen-containing compounds (dehalogenation). The present disclosure solves these problems in the art by providing a hybrid catalyst comprising red mud particles and ZSM-5 zeolite particles. In embodiments, the hybrid catalyst may comprise composite particles that include both the red mud particles and the ZSM-5 zeolite particles. The hybrid catalyst of the present disclosure may enable simultaneous dehalogenation and conversion of the plastic derived oil to greater value chemical products and intermediates in a single fluidized catalytic cracking reactor system and in a single catalyst contacting step. During cracking with the ZSM-5 zeolite, the chlorine in organochlorides is given off as HCl, which is then captured by the metal oxides present in red mud to form metal chlorides. Therefore, the red mud acts as a trap for the HCl, thus preserving the active sites in the ZSM-5 zeolite particles. The red mud particles may also trap other hydrogen halides produced from cracking of other halogen-containing compounds. The acid sites in the ZSM-5 zeolite particles also help to activate difficult-to-crack halogen-containing compounds, such as but not limited to the olefinic, naphthenic and aromatic organochlorides. Cracking of the larger halogen-containing compounds can increase access to halogen atoms buried in the larger molecules, which increases the removal of halogen-containing compounds, such as organochloride compounds, from the reaction products. Thus, the combination of the red mud particles and the ZSM-5 zeolite particles may increase the amount of halogen-containing compounds removed from the plastic derived oil compared to conventional decontamination catalysts or halogen adsorbents.

The processes of the present disclosure may include contacting the plastic derived oil with the hybrid catalyst in a single FCC reactor system to produce the greater value chemicals and intermediates, which may include but are not limited to light olefins, light aromatic compounds, light naphtha, low carbon footprint fuel blending components such as low-carbon jet fuel or diesel fuel, other circular chemicals, or combinations of these. Thus, the processes of the present disclosure include simultaneous decontamination and conversion of the plastic derived oils in a single step to produce the greater value chemicals and intermediates, which improves the efficiency of the conversion process. The processes of the present disclosure may also improve the removal of halogens, such as chlorides, from the reaction products to produce the greater value chemicals and intermediates having reduced concentrations of halogens compared to reaction products produced by conventional processes.

The processes of the present disclosure produce greater value chemicals and intermediates that are circular chemicals, which are defined as chemicals that are recovered from waste and reused to make additional products. The hybrid catalyst and processes of the present disclosure may also enable the recycling of a broader range of types of solid waste plastic while reducing downstream problems caused by halogen-containing compounds (such as organochlorides) or other contaminants. The reaction products can be considered to have a low carbon footprint. Low carbon footprint fuels and fuel components can help to reduce greenhouse emissions and mitigate the effects of climate change. The hybrid catalysts and processes also provide a beneficial use for a red mud, which is an industrial waste product produced from the production of alumina from bauxite through the Bayer process. The hybrid catalyst and processes of the present disclosure can be easily integrated into existing petroleum refineries and petrochemical installations, such as existing FCC reactor systems, among other features.

Referring now to FIG. 1, one embodiment of a system 100 for upgrading a plastic derived oil stream 102 is schematically depicted. The system 100 may include a plastic derived oil stream 102, an FCC system 110, and an effluent separation system 150 disposed downstream of the FCC system 110. The FCC system 110 may be configured to contact the plastic derived oil stream 102 with the hybrid catalyst 114 in a fluidized bed reactor at reaction conditions, separate an FCC effluent 122 from the used hybrid catalyst 124, and regenerate the used hybrid catalyst 124 to produce a regenerated hybrid catalyst 132. The effluent separation system 150 may be configured to separate the FCC effluent 122 to produce a plurality of product streams, such as but not limited to an ethylene stream, a propylene stream, a mixed butenes stream, a light aromatics stream, a light naphtha stream, a gasoline stream, a jet fuel stream, a diesel stream, a heavy compounds stream, or combinations of these.

The FCC system 110 may include an FCC reactor 112, which may be a fluidized bed reactor configured to contact the plastic derived oil stream 102 with the hybrid catalyst 114 at reaction conditions sufficient to convert at least a portion of hydrocarbons in the plastic derived oil stream 102 and simultaneously decontaminate the plastic derived oil stream 102 and reaction products produced from the plastic derived oil stream 102. The FCC system 100 may further comprise a fluid-solid separation unit 120 disposed at an outlet end of the FCC reactor 112. The fluid-solid separation unit 120 may be configured to separate the FCC effluent 122 from the used hybrid catalyst 124. Referring again to FIG. 1, the FCC system 110 may further include a catalyst regenerator 130 disposed downstream of the fluid-solid separation unit 120. The catalyst regenerator 130 may be configured to regenerate the used hybrid catalyst 124 to produce a regenerated hybrid catalyst 132, which may be passed back to the FCC reactor 112 as at least a portion of the hybrid catalyst 114.

The plastic derived oil stream 102 may be a liquid stream comprising hydrocarbons and produced through melting, dehalogenation, and pyrolysis of solid waste plastics. As previously discussed, the plastic derived oil stream 102 may include hydrocarbons, such as but not limited to aromatic compounds, olefins, alkanes, other hydrocarbon compounds. Additionally, the plastic derived oil stream 102 may include other organic compounds, such as but not limited to oxygenates, halogen-containing compounds such as organic halide compounds, plastic additives, and other contaminants. The plastic derived oil stream 102 may comprise a concentration of halogen-containing compounds of from 10 part per million by weight (ppmw) to 500 ppmw. In embodiments, the plastic derived oil stream 102 may comprise a concentration of halogen-containing compounds of from 10 ppmw to 400 ppmw, from 10 ppmw to 300 ppmw, from 50 ppmw to 500 ppmw, from 50 ppmw to 400 ppmw, from 50 ppmw to 300 ppmw, from 100 ppmw to 500 ppmw, from 100 ppm to 400 ppmw, from 100 ppmw to 300 ppmw, from 150 ppmw to 500 ppmw, from 150 ppmw to 400 ppmw, or from 150 ppmw to 300 ppmw. In embodiments, the plastic derived oil stream 102 may have a concentration of halogen-containing compounds of greater than or equal to 100 ppmw.

In embodiments, the plastic derived oil stream 102 may comprise light naphtha range hydrocarbons, jet fuel constituents, diesel range constituents, heavy compounds, or combinations of these. Light naphtha range hydrocarbons refer to hydrocarbons having atmospheric boiling point temperatures of from 0 °C to 150 °C, jet fuel constituents include hydrocarbons having atmospheric boiling point temperatures of from 150 °C to 300 °C, diesel range constituents include hydrocarbons having atmospheric boiling point temperatures of from 300 °C to 343 °C, and the heavy compounds refer to hydrocarbons having atmospheric boiling point temperatures of greater than 343 °C. In embodiments, the plastic derived oil stream 102 may comprise from 20 wt. % to 35 wt. % light naphtha range hydrocarbons, such as from 20 wt. % to 30 wt. %, from 20 wt. % to 25 wt. %, or about 23.8 wt. % of the light naphtha range hydrocarbons based on the total weight of the plastic derived oil stream 102. In embodiments, the plastic derived oil stream 102 may comprise from 40 wt. % to 70 wt. % jet fuel constituents, such as from 40 wt. % to 60 wt. %, from 40 wt. % to 55 wt. %, from 40 wt. % to 50 wt. %, from 45 wt. % to 60 wt. %, from 45 wt. % to 55 wt. %, from 45 wt. % to 50 wt. %, or about 49.7 wt. % jet fuel constituents based on the total weight of the plastic derived oil stream 102. In embodiments, the plastic derived oil stream 102 may comprise from 5 wt. % to 25 wt. % of the diesel range constituents, such as from 5 wt. % to 20 wt. %, from 5 wt. % to 15 wt. %, from 10 wt. % to 25 wt. %, from 10 wt. % to 20 wt. %, from 10 wt. % to 15 wt. %, or about 15.2 wt. % of the diesel range constituents based on the total weight of the plastic derived oil stream 102. In embodiments, the plastic derived oil stream 102 may comprise from 5 wt. % to 25 wt. % heavy compounds, such as from 5 wt. % to 20 wt. %, from 5 wt. % to 15 wt. %, from 10 wt. % to 25 wt. %, from 10 wt. % to 20 wt. %, from 10 wt. % to 15 wt. %, or about 11.3 wt. % heavy compounds based on the total weight of the plastic derived oil stream 102.

In embodiments, the plastic derived oil stream 102 may comprise naphtha range hydrocarbons, middle distillates, heavy compounds, or combinations of these. Naphtha range hydrocarbons refer to hydrocarbons having atmospheric boiling point temperatures of from 25 °C to 221 °C, middle distillates include hydrocarbons having atmospheric boiling point temperatures of from 221 °C to 343 °C, and the heavy compounds refer to hydrocarbons having atmospheric boiling point temperatures of greater than 343 °C. In embodiments, the plastic derived oil stream 102 may comprise from 20 wt. % to 45 wt. % naphtha range hydrocarbons, such as from 20 wt. % to 40 wt. %, from 20 wt. % to 35 wt. %, from 20 wt. % to 30 wt. %, from 30 wt. % to 45 wt. %, from 30 wt. % to 40 wt. %, from 35 wt. % to 45 wt. %, from 35 wt. % to 40 wt. %, or about 38 wt. % naphtha range hydrocarbons based on the total weight of the plastic derived oil stream 102. In embodiments, the plastic derived oil stream 102 may comprise from 40 wt. % to 70 wt. % middle distillates, such as from 40 wt. % to 60 wt. %, from 40 wt. % to 55 wt. %, from 40 wt. % to 50 wt. %, from 45 wt. % to 70 wt. %, from 45 wt. % to 60 wt. %, from 45 wt. % to 55 wt. %, from 45 wt. % to 50 wt. %, or about 48 wt. % middle distillates based on the total weight of the plastic derived oil stream 102. In embodiments, the plastic derived oil stream 102 may comprise from 5 wt. % to 25 wt. % heavy compounds, such as from 5 wt. % to 20 wt. %, from 5 wt. % to 15 wt. %, from 10 wt. % to 25 wt. %, from 10 wt. % to 20 wt. %, from 10 wt. % to 15 wt. %, or about 14 wt. % heavy compounds based on the total weight of the plastic derived oil stream 102.

The plastic derived oil stream 102 may be characterized by a boiling point distribution determined using standard test method ASTM D2887. In embodiments, the plastic derived oil stream 102 may have an initial boiling point (IBP) of from 20 °C to 100 °C, such as from 20 °C to 60 °C, from 20 °C to 50 °C, from 25 °C to 100 °C from 25 °C to 60 °C, from 25 °C to 50 °C, or from 25 °C to 40 °C. In embodiments, the plastic derived oil stream 102 may have a final boiling point (FBP) of from 300 °C to 600 °C, such as from 300 °C to 500 °C, from 300 °C to 450 °C, from 350 to 600 °C, from 350 °C to 500 °C, from 350 °C to 450 °C, or from 375 °C to 425 °C. In embodiments, the plastic derived oil stream 102 may have a 50% boiling point temperature of from 150 °C to 350 °C, such as from 150 °C to 300 °C, from 150 °C to 275 °C, from 200 °C to 350 °C, from 200 °C to 300 °C, from 200 °C to 275 °C, from 225 °C to 350 °C, from 225 °C to 300 °C, or from 225 °C to 275 °C, where the 50% boiling point temperature is the temperature in the boiling point distribution at which 50 wt. % of the constituents of the plastic derived oil stream 102 have transitioned from the liquid phase into the vapor phase.

In embodiments, the plastic derived oil stream 102 may have a density of from 0.65 g/ml to 1.1 g/ml, such as from 0.65 g/ml to 1.0 g/ml, from 0.65 g/ml to 0.9 g/ml, from 0.65 g/ml to 0.8 g/ml, from 0.7 g/ml to 1.1 g/ml, from 0.7 g/ml to 1.0 g/ml, from 0.7 g/ml to 0.9 g/ml, from 0.7 g/ml to 0.8 g/ml, from 0.75 g/ml to 1.1 g/ml, from 0.75 g/ml to 1.0 g/ml, from 0.75 g/ml to 0.9 g/ml, or from 0.75 g/ml to 0.85 g/ml, as determined by ASTM D4052. In embodiments, the plastic derived oil stream 102 may have less than or equal to 0.1 wt. % sulfur, as determined by ASTM D4294. In embodiments, the plastic derived oil stream 102 may have less than 0.01 wt. % Conradson carbon, as determined according to ASTM D4530. In embodiments, the plastic derived oil stream 102 may have an oxygen content of from 100 ppmw to 10,000 ppmw, such as from 100 ppmw to 7,000 ppmw, from 500 ppmw to 10,000 ppmw, from 500 ppmw to 7000 ppmw, from 1000 to 10,000 ppmw, from 1000 to 7000 ppmw, or from 5000 ppm to 10,000 ppmw. In embodiments, the plastic derived oil stream 102 may have a moisture content (concentration of water) of less than or equal to 5000 ppmw, less than or equal to 2000 ppmw, less than or equal to 1000 ppmw, less than or equal to 500 ppmw, or less than or equal to 400 ppmw, as determined according to ASTM D6304A. In embodiments, the plastic derived oil stream 102 may have the properties provided in Table 1.

TABLE 1

| Properties of one embodiment of the plastic derived oil stream 102 | | | |
|---|---|---|---|
| Property | Units | Test Method | Value |
| Density | g/mL | ASTM D4052 | 0.792 |
| Total Oxygen Concentration | ppmw | Combustion based | 5540 |
| Total Chloride Concentration | ppmw | UOP 779 | 342 |
| Total Sulfur | wt. % | ASTM D4294 | 0.064 |
| Total Nitrogen | ppmw | ASTM D4629 | 1135 |
| Bromine Number | g($Br_2$)/100 g | ASTM D1159 | 43.3 |
| Silica | ppmw | UOP 407 | 0.109 |
| Sodium | ppmw | UOP 407 | 0.174 |
| Iron | ppmw | UOP 407 | 0.097 |
| Water | ppmw | ASTM D6304A | 299 |
| Conradson Carbon Residue | wt. % | ASTM D4530 | <0.01 |

| Simulated Distillation Table | | | |
|---|---|---|---|
| Recovery (wt. %) | Units | Test Method | Temperature |
| SIMDIST - IBP | °C | ASTM D2887 | 29.4 |
| SIMDIST - 5 wt. % | °C | ASTM D2887 | 77.7 |
| SIMDIST - 10 wt. % | °C | ASTM D2887 | 107.1 |
| SIMDIST - 15 wt. % | °C | ASTM D2887 | 127.3 |
| SIMDIST - 20 wt. % | °C | ASTM D2887 | 139.9 |
| SIMDIST - 25 wt. % | °C | ASTM D2887 | 158.7 |
| SIMDIST - 30 wt. % | °C | ASTM D2887 | 173.6 |
| SIMDIST - 35 wt. % | °C | ASTM D2887 | 188.7 |
| SIMDIST - 40 wt. % | °C | ASTM D2887 | 207.9 |
| SIMDIST - 45 wt. % | °C | ASTM D2887 | 225.6 |
| SIMDIST - 50 wt. % | °C | ASTM D2887 | 240.0 |
| SIMDIST - 55 wt. % | °C | ASTM D2887 | 253.9 |
| SIMDIST - 60 wt. % | °C | ASTM D2887 | 266.2 |
| SIMDIST - 65 wt. % | °C | ASTM D2887 | 279.3 |
| SIMDIST - 70 wt. % | °C | ASTM D2887 | 293.8 |
| SIMDIST - 75 wt. % | °C | ASTM D2887 | 307.1 |
| SIMDIST - 80 wt. % | °C | ASTM D2887 | 320.2 |
| SIMDIST - 85 wt. % | °C | ASTM D2887 | 333.7 |
| SIMDIST - 90 wt. % | °C | ASTM D2887 | 347.8 |
| SIMDIST - 95 wt. % | °C | ASTM D2887 | 364.7 |
| SIMDIST - FBP | °C | ASTM D2887 | 405.3 |

The plastic derived oil stream 102 may be produced from solid waste plastic through melting and dehalogenation followed by pyrolysis. Referring now to FIG. 2, the systems 100 disclosed herein may further include a dehalogenation unit 10 and a pyrolysis reactor 20, both of which may be disposed upstream of the FCC system 110. The dehalogenation unit 10 may be operable to melt solid waste plastic 12 to produce a liquefied plastic stream 14. The liquefied plastic stream 14 may be passed to the pyrolysis reactor 20 downstream of the dehalogenation unit 10. The pyrolysis reactor 20 may be configured to subject the liquefied plastic stream 14 to pyrolysis to produce the plastic derived oil 102. The processes disclosed herein may include producing the plastic derived oil stream 102 stream from a solid waste plastic 12 by liquefying the solid waste plastic 12 in the dehalogenation unit 10 to produce a liquefied plastic stream 14, passing the liquefied plastic stream 14 to the pyrolysis reactor 20, and subjecting the liquefied plastic stream 14 to pyrolysis to produce the plastic derived oil stream 102.

The solid waste plastic 12 supplied to the dehalogenation unit 10 may comprise a plastic feedstock including mixed solid waste plastics of differing compositions. The solid waste plastic 12 may be a mixture of plastics from various polymer families. In embodiments, the solid waste plastics 12 may comprise plastics representative of one or more of the polymer families, such as but not limited to olefins, carbonates, aromatic polymers, sulfones, fluorinated hydrocarbon polymers, chlorinated hydrocarbon polymers, acrylonitriles, or combinations of these families of polymers. In embodiments, the mixed waste plastics 12 may include polyethylene (PE), polypropylene (PP), diphenylcarbonate, polystyrene (PS), polyether sulfone, polyfluoroethylene (PTFE), polyvinyl chloride (PVC), polyacrylonitrile (PAN), other polymers, or combinations of these. In embodiments, solid waste plastics 12 may be a mixture of high density polyethylene (HDPE, for example, a density of about 0.93 to 0.97 grams per cubic centimeter (g/$cm^3$), low density polyethylene (LDPE, for example, about 0.910 g/$cm^3$ to 0.940 g/$cm^3$), polypropylene (PP), linear low density polyethylene (LLDPE), polystyrene (PS), polyvinyl chloride (PVC), polyethylene terephthalate (PET), or combinations of these polymers. In embodiments, the solid waste plastics 12 may include one or more chlorinated hydrocarbons, such as PVC. The plastics of the solid waste plastics 12 may be natural, synthetic, or semi-synthetic polymers. Utilization of the solid waste plastics 12 comprising a mixture of different types of plastics and polymers may allow for recycling of solid plastics without necessitating fine sorting of the plastics into different types.

The solid waste plastics 12 may be provided in a variety of different forms. In embodiments, the solid waste plastics 12 may be in the form of a powder in smaller scale operations. In embodiments, the solid waste plastics 12 may be in the form of pellets, such as pellets with a particle size of from 1 to 5 millimeter (mm) for larger scale operations. In embodiments, the solid waste plastics 12 may be provided as chopped or ground waste plastics. In embodiments, the system 100 may include a plastic grinding unit (not shown) upstream of the dehalogenation reactor, where the plastic grinding unit may be operable to grind plastic articles into smaller pieces to produce the solid waste plastics 12. In embodiments, the solid waste plastics 12 may comprise waste plastic, manufacturing off-spec product, new plastic products, unused plastic products, or combinations of these.

The dehalogenation unit 10 may be in fluid communication with the solid waste plastics 12 and may be operable to raise the temperature of the solid waste plastics 12 to a temperature between 250 °C and 350 °C, such as from 250 °C to 300 °C, to melt the plastics and generate the liquefied plastic stream 14. When the solid waste plastics 12 include halogenated plastics, such as but not limited to PVC, melting the plastics may release some hydrogen halides, such as HCl. The dehalogenation unit 10 may also be operable to scrub HCl and other halogen halides released during melting of the solid waste plastics 12. Removal of some of the chlorine, fluorine, or other halides from the solid waste plastic 12 may reduce the concentration of halides in the liquefied plastic stream 14. As a result, the liquefied plastic stream 14 may have a reduced concentration of chlorine and other halogens compared to the solid waste plastic 12. Reducing the concentration of organic halide compounds in the liquefied plastic stream 14 may reduce corrosion problems in the downstream pyrolysis reactor 20. However, the liquefied plastic stream 14 may still contain halogen-containing organic compounds and other contaminants.

In embodiments, the dehalogenation reactor 10 may be operable to increase the temperature of the solid waste plastic 12 to a temperature of from 250 °C to 350 °C to melt the solid waste plastic 12 and remove at least a portion of the chlorine and other halogens from the resulting liquefied plastic stream 14. In embodiments, the dehalogenation reactor 10 may be operable to increase the temperature of the solid waste plastic 12 to a temperature of from 250 °C to 325 °C, from 250 °C to 300 °C, from 275 °C to 350 °C, from 275 °C to 325 °C, or from 300 °C to 350 °C. The temperature of the dehalogenation reactor 10 may be controlled to remove HCl without cracking a substantial number of C—H or C—C bonds.

In embodiments, the HCl and other hydrogen halides released from the liquefied plastic stream 14 may be passed out of the dehalogenation unit 10 as a halogen-rich stream 16. The halogen-rich stream may include hydrogen halides, such as HCl, as well as hydrogen and light hydrocarbon gases, such as but not limited to mono aromatics, hydrogen, methane, and $C_2$-$C_5$ gases. In embodiments, the halogen-rich stream 16 may be scrubbed with water or a sodium hydroxide solution in a downstream acid gas scrubbing unit (not shown) to remove the halogen compounds from the halogen-rich stream 16. In embodiments, the hydrogen halide compounds may be scrubbed within the dehalogenation unit 10, such as by contacting the released gases with adsorbents, such as but not limited to $Al_2O_3$, zeolites, or other chemical removers. In embodiments, the dehalogenation unit 10 may include a melting reactor and an acid gas scrubber downstream of the melting reactor. In embodiments, a single unit forming the dehalogenation unit 10 may achieve both melting of the plastic solid plastic and scrubbing to remove hydrogen halides. Organic halide compounds not released during dehalogenation in the dehalogenation unit 10 may be passed onward in the liquefied plastic stream 14 to the pyrolysis reactor 20.

Referring again to FIG. 2, the pyrolysis reactor 20 may be disposed downstream of the dehalogenation unit 10 and in fluid communication with the liquefied plastic stream 14 discharged from the dehalogenation unit 10. The pyrolysis reactor 20 may be operable to increase the temperature of the liquefied plastic stream 14 to a temperature of from 300 °C to 1000 °C, such as from 350 °C to 1000 °C, in an anaerobic environment, to convert the liquefied plastic stream 14 to the plastic derived oil stream 102. As described herein, an "anaerobic environment" is an environment in which no oxygen is present. In particular, the pyrolysis of the liquefied plastic stream 14 in the pyrolysis reactor 20 may cause at least a portion of the long chain polymers in the liquefied plastic stream 14 to break apart into smaller fragments comprising organic compounds having smaller average molecular weights compared to the long chain polymers in the liquefied plastic stream 14.

The specific reactor used as the pyrolysis reactor 20 can be of different types and are not limited for the purposes of the present disclosure. Typical reactor types that can be used to serve the function of the pyrolysis reactor 20 can include but are not limited to tank reactors, rotary kilns, packed catalyst bed reactors, bubbling bed reactors, or other types of reactors. In embodiments, the pyrolysis of the liquefied plastic stream 14 in the pyrolysis reactor 20 may be performed in the presence or absence of a pyrolysis catalyst at a temperature of from 300 °C to 1000 °C or from 350 °C to 1000 °C. In embodiments, the pyrolysis reactor 20 may operate at a low severity at a temperature less than or equal to 450 °C or at a high severity at a temperature greater than 450 °C. In embodiments, the pyrolysis reactor 20 may be operated at a temperature of from 400 °C to 600 °C, from 400 °C to 500 °C, from 400 °C to 450 °C, from 450 °C to 500 °C, or from 425 °C to 475 °C. In embodiments, the pyrolysis reactor 20 may be operated at a pressure in the range of 1 bar to 100 bars (100 kilopascals (kPa) to 10,000 kPa), from 1 bar to 50 bars (100 kPa to 5000 kPa), from 1 bar to 25 bars (1 kPa to 2500 kPa), or from 1 bar to 10 bars (1 kPa to 1000 kPa). Further, in various embodiments, the residence time of the liquefied plastic stream 14 in the pyrolysis reactor 20 may be from 1 second to 3600 seconds, from 60 seconds to 1800 seconds, or from 60 seconds to 900 seconds. The plastic derived oil stream 102 may be passed out of the pyrolysis reactor 20.

Referring again to FIG. 1, the plastic derived oil stream 102 may be passed to the FCC system 110, such as to the FCC reactor 112 of the FCC system 110. In embodiments, the FCC reactor 112 of the FCC system 110 may be downstream of the pyrolysis reactor 20 and in fluid communication with the pyrolysis reactor 20 to pass the plastic derived oil stream 102 from the pyrolysis reactor 20 to the FCC reactor 112. The FCC reactor 112 may comprise the hybrid catalyst 114 of the present disclosure comprising the red mud particles and the ZSM-5 zeolite particles. Contact of the plastic derived oil stream 102 with the hybrid catalyst 114 at the reaction conditions may cause halogen-containing hydrocarbons to react with the red mud particles of the hybrid catalyst 114 to form hydrogen halides and hydrocarbons and to cause at least a portion of the resulting hydrogen halides to be adsorbed onto the red mud particles. Contact of the plastic derived oil stream 102 with the hybrid catalyst 114, in particular with the ZSM-5 zeolite particles of the hybrid catalyst 114, may also cause hydrocarbons and halogen-containing hydrocarbons to under catalytic cracking, which may convert the hydrocarbons to lighter oils and hydrocarbon gases, which may increase access of halogen-containing compounds to the red mud particles in the hybrid catalyst 114 and increase removal of the halogen-containing compounds from the plastic derived oil stream 102. Contact of the plastic derived oil stream 102 with the hybrid catalyst 114 may produce an FCC effluent 122 having a reduced concentration of halogen-containing compounds and other contaminants compared to the plastic derived oil 102. The FCC effluent 122 may also include a greater concentration of greater-value chemicals and intermediates, such as but not limited to light olefins (ethylene, propylene, mixed butenes), light aromatic compounds, light naphtha, gasoline constituents, jet fuel constituents, diesel constituents, or combinations of these greater value chemicals and intermediates.

The FCC reactor 112 may be a fluidized bed reactor. The FCC reactor 112 may include one or a plurality of fluidized bed reactors. When the FCC reactor 112 comprises a plurality of reactors, the plurality of reactors may be parallel, such as for purposes of increasing capacity of the FCC system 110 for upgrading the plastic derived oil stream 102. In embodiments, the FCC reactor 112 is a fluidized bed reactor in which the plastic derived oil stream 102 and the hybrid catalyst 114 are combined together at one end of the reactor and flow co-currently through the fluidized bed reactor to an outlet of the FCC reactor 112. The FCC reactor 112 may be a riser reactor or a downer reactor. In embodiments, the FCC reactor 112 may be a riser reactor.

As previously discussed, the FCC system 110 may include the hybrid catalyst 114. The hybrid catalyst 114 may include red mud particles and ZSM-5 zeolite particles. The hybrid catalyst 114 may be a mixture of the red mud particles and the ZSM-5 zeolite particles or may comprise a plurality of composite particles that each comprise both the red mud particles and the ZSM-5 zeolite particles.

In embodiments, the hybrid catalyst 114 may comprise from 1 wt. % to 20 wt. % red mud particles and from 5 wt. % to 40 wt. % ZSM-5 zeolite particles, per unit weight of the hybrid catalyst 114. In embodiments, the hybrid catalyst may further comprise a matrix material and a binder. The hybrid catalyst may comprise from 20 wt. % to 60 wt. % of the matrix material and from 10 wt. % to 20 wt. % of the binder, per unit weight of the hybrid catalyst 114.

The red mud particles are made from red mud, which is a waste product from the production of alumina from bauxite through the Bayer process. The red mud particles include iron oxides along with other metal oxides, which are randomly distributed throughout the red mud particles. The iron oxide and other metal oxides are useful for decontamination of the plastic derived oil, such as by removing halogens from the plastic derived oil through reactive adsorption. Reactive adsorption refers to reaction of halogen-containing hydrocarbons, such as chlorine-containing hydrocarbons, to produce hydrogen halides (e.g., HCl) followed by adsorption of the hydrogen halides onto the surface of the red mud particles to form metal halides. Use of the red mud particles in the hybrid catalyst 114 provides a beneficial use of a waste product.

The metal oxides of the red mud particles may include metal oxides that promote reaction of halogen-containing hydrocarbon compounds to produce hydrogen halides and hydrocarbon compounds and that adsorb hydrogen halides, such as but not limited to HCl. The metal oxides in the red mud particles may include oxides of alkali metals, alkaline earth metals, metals in groups 3-13 of the International Union of Pure and Applied Chemistry (IUPAC) periodic table, or combinations of these. In embodiments, the red mud particles may also include oxides of metalloids, such as oxides of silicon. As used herein, the term "metal oxide" includes metalloid oxides. In embodiments, the red mud particles may include oxides of iron, aluminum, titanium, calcium, silicon, and sodium. In embodiments, the red mud particles may comprise $Fe_2O_3$, $Al_2O_3$, CaO, $SiO_2$, and $NaO_2$. In embodiments, the red mud particles may further include $TiO_2$.

The red mud particles may include iron oxide ($Fe_2O_3$) as one of the plurality of metal oxides. In embodiments, the red mud particles may include from 1 wt. % to 70 wt. % $Fe_2O_3$, such as from 1 wt. % to 60 wt. %, from 1 wt. % to 50 wt. %, from 5 wt. % to 60 wt. %, from 5 wt. % to 50 wt. %, from 10 wt. % to 60 wt. %, from 10 wt. % to 50 wt. %, from 15 wt. % to 60 wt. %, or from 15 wt. % to 50 wt. % $Fe_2O_3$ based on the total weight of the red mud particles.

The red mud particles may include $Al_2O_3$ (alumina) as one of the plurality of metal oxides. In embodiments, the red mud particles may include from 1 wt. % to 40 wt. % $Al_2O_3$, such as from 1 wt. % to 30 wt. %, from 1 wt. % to 25 wt. %, from 1 wt. % to 20 wt. %, from 5 wt. % to 30 wt. %, from 5 wt. % to 25 wt. %, from 5 wt. % to 20 wt. %, from 10 wt. % to 30 wt. %, from 10 wt. % to 25 wt. %, or from 10 wt. % to 20 wt. % of the $Al_2O_3$ based on the total weight of the red mud particles.

The red mud particles may include $TiO_2$ as one of the plurality of metal oxides. In embodiments, the red mud particles may include from 0 (zero) wt. % to 15 wt. % $TiO_2$, such as from 0 wt. % to 10 wt. %, from 0 wt. % to 5 wt. %, from 0.1 wt. % to 15 wt. %, from 0.1 wt. % to 10 wt. %, from 0.1 wt. % to 5 wt. %, from 1 wt. % to 15 wt. %, from 1 wt. % to 10 wt. %, from 1 wt. % to 5 wt. %, from 5 wt. % to 15 wt. %, or from 5 wt. % to 10 wt. % of the $TiO_2$ based on the total weight of the red mud particles.

The red mud particles may include CaO as one of the plurality of metal oxides. In embodiments, the red mud particles may include from 1 wt. % to 20 wt. % of the CaO, such as from 1 wt. % to 15 wt. %, from 1 wt. % to 14 wt. %, from 1 wt. % to 10 wt. %, from 2 wt. % to 20 wt. %, from 2 wt. % to 15 wt. %, from 2 wt. % to 14 wt. %, from 2 wt. % to 10 wt. %, from 5 wt. % to 20 wt. %, from 5 wt. % to 15 wt. %, from 5 wt. % to 14 wt. %, or from 5 wt. % to 10 wt. % of the CaO based on the total weight of the red mud particles.

The red mud particles may include $Na_2O$ as one of the plurality of metal oxides. In embodiments, the red mud particles may include from 1 wt. % to 10 wt. % $Na_2O$, such as from 1 wt. % to 7.5 wt. %, from 1 wt. % to 5 wt. %, from 2 wt. % to 10 wt. %, from 2 wt. % to 7.5 wt. %, or from 2 wt. % to 5 wt. % of the $Na_2O$ based on the total weight of the red mud particles.

The red mud particles may include $SiO_2$ as one of the plurality of metal oxides. In embodiments, the red mud particles may include from 3 wt. % to 50 wt. % $SiO_2$, such as from 3 wt. % to 40 wt. %, from 3 wt. % to 30 wt. %, from 5 wt. % to 50 wt. %, from 5 wt. % to 40 wt. %, from 5 wt. % to 30 wt. %, from 10 wt. % to 50 wt. %, from 10 wt. % to 40 wt. %, or from 10 wt. % to 30 wt. % of the $SiO_2$ based on the total weight of the red mud particles.

In embodiments, the red mud particles may comprises from 5 wt. % to 60 wt. % $Fe_2O_3$, from 5 wt. % to 30 wt. % $Al_2O_3$, from 0 (zero) wt. % to 15 wt. % $TiO_2$, from 2 wt. % to 14 wt. % CaO, from 3 wt. % to 50 wt. % $SiO_2$, and from 1 wt. % to 10 wt. % $Na_2O$ based on the total weight of the red mud.

The red mud particles may be characterized by a total surface area, total pore volume, an average pore size, or any combination thereof. The red mud particles may have a total surface area that is less than the total surface area of the ZSM-5 zeolite particles. In embodiments, the red mud particles may have a total surface area of less than or equal to 50 meters squared per gram ($m^2/g$), such as from 10 $m^2/g$ to 50 $m^2/g$, from 10 $m^2/g$ to 40 $m^2/g$, from 15 $m^2/g$ to 50 $m^2/g$, from 15 $m^2/g$ to 40 $m^2/g$, from 20 $m^2/g$ to 50 $m^2/g$, from 20 $m^2/g$ to 40 $m^2/g$, from 25 $m^2/g$ to 50 $m^2/g$, from 25

$m^2/g$ to 40 $m^2/g$, from 10 $m^2/g$ to 35 $m^2/g$, from 10 $m^2/g$ to 30 $m^2/g$, from 25 $m^2/g$ to 35 $m^2/g$, or about 29 $m^2/g$. The red mud particles may have a total pore volume less than the total pore volume of the ZSM-5 zeolite particles. In embodiments, the red mud particles may have a total pore volume of less than or equal to 0.1 cubic centimeters per gram ($cm^3/g$), such as from 0.06 $cm^3/g$ to 0.1 $cm^3/g$, from 0.065 $cm^3/g$ to 0.095 $cm^3/g$, from 0.07 $cm^3/g$ to 0.09 $cm^3/g$, from 0.075 $cm^3/g$ to 0.085 $cm^3/g$, or about 0.084 $cm^3/g$. The red mud particles may have an average pore size that is greater than the average pore size of the ZSM-5 zeolite particles. In embodiments, the red mud particles may have an average pore size of greater than 100 nanometers (nm), such as from 110 nm to 150 nm, from 110 nm to 130 nm, from 112 nm to 128 nm, from 114 nm to 126 nm, from 116 nm to 124 nm, from 115 nm to 125 nm, or about 117 nm.

The hybrid catalyst 114 may include an amount of the red mud particles sufficient to adsorb the HCl produced during contacting of the plastic derived oil stream 102 with the hybrid catalyst 114 in the FCC reactor. In embodiments, the hybrid catalyst 114 may have from 1 wt. % to 20 wt. % of the red mud particles based on the unit weight of the hybrid catalyst 114. In embodiments, the hybrid catalyst 114 may have from 1 wt. % to 18 wt. %, from 1 wt. % to 15 wt. %, from 1 wt. % to 10 wt. %, from 2 wt. % to 20 wt. %, from 2 wt. % to 18 wt. %, from 2 wt. % to 15 wt. %, from 2 wt. % to 10 wt. %, from 5 wt. % to 20 wt. %, from 5 wt. % to 18 wt. %, from 5 wt. % to 15 wt. %. from 5 wt. % to 10 wt. %, or from 10 wt. % to 20 wt. % of the red mud particles per unit weight of the hybrid catalyst 114.

As previously discussed, the hybrid catalyst 114 further includes ZSM-5 zeolite, which serves as a cracking catalyst to facilitate fluidized catalytic cracking of hydrocarbons in the plastic derived oil stream 102 in the FCC reactor 112. ZSM-5 zeolites are widely used for chemical processing, fuel upgrading, and production of petrochemical intermediates. In general, "ZSM-5" generally refers to zeolites having an MFI framework type according to the IZA zeolite nomenclature and consisting majorly of silica and alumina, as is understood by those skilled in the art. ZSM-5 refers to "Zeolite Socony Mobil-5" and is a pentasil family zeolite that can be represented by the chemical formula $Na_nAl_nSi_{96-n}O_{192}\cdot16H_2O$, where $0<n<27$.

In embodiments, the ZSM-5 zeolite particles may have a total surface area of from 75 $m^2/g$ to 125 $m^2/g$, such as from 85 $m^2/g$ to 125 $m^2/g$, from 95 $m^2/g$ to 125 $m^2/g$, from 105 $m^2/g$ to 125 $m^2/g$, from 115 $m^2/g$ to 125 $m^2/g$, from 75 $m^2/g$ to 115 $m^2/g$, from 75 $m^2/g$ to 105 $m^2/g$, from 75 $m^2/g$ to 95 $m^2/g$, from 75 $m^2/g$ to 85 $m^2/g$, from 95 $m^2/g$ to 115 $m^2/g$, from 100 $m^2/g$ to 110 $m^2/g$, or about 105 $m^2/g$. In embodiments, the ZSM-5 zeolite particles may have a total pore volume of from 0.05 $cm^3/g$ to 0.25 $cm^3/g$, such as from 0.05 $cm^3/g$ to 0.225 $cm^3/g$, from 0.05 $cm^3/g$ to 0.2 $cm^3/g$, from 0.05 $cm^3/g$ to 0.175 $cm^3/g$, from 0.05 $cm^3/g$ to 0.15 $cm^3/g$, from 0.075 $cm^3/g$ to 0.25 $cm^3/g$, from 0.1 $cm^3/g$ to 0.25 $cm^3/g$, from 0.075 $cm^3/g$ to 0.2 $cm^3/g$, from 0.1 $cm^3/g$ to 0.15 $cm^3/g$, or about 0.125 $cm^3/g$. In embodiments, the ZSM-5 zeolite particles may have an average pore size of from 35 nm to 60 nm, such as from 40 nm to 60 nm, from 45 nm to 60 nm, from 35 nm to 55 nm, from 35 nm to 50 nm, or about 47 nm.

The hybrid catalyst 114 may include an amount of the ZSM-5 zeolite particles sufficient to crack the hydrocarbons in the plastic derived oil stream 102 to produce the greater value chemicals and intermediates. The hybrid catalyst 114 may include from 5 wt. % to 40 wt. % of the ZSM-5 zeolite particles per unit weight of the hybrid catalyst 114. In embodiments, the hybrid catalyst 114 may comprise from 5 wt. % to 35 wt. %, from 5 wt. % to 30 wt. %, from 5 wt. % to 25 wt. %, from 5 wt. % to 20 wt. %, from 5 wt. % to 15 wt. %, from 10 wt. % to 40 wt. %, from 10 wt. % to 35 wt. %, from 10 wt. % to 30 wt. %, from 10 wt. % to 25 wt. %, from 10 wt. % to 20 wt. %, from 10 wt. % to 15 wt. %, from 15 wt. % to 40 wt. %, from 15 wt. % to 35 wt. %, from 15 wt. % to 30 wt. %, from 15 wt. % to 25 wt. %, from 20 wt. % to 40 wt. %, from 20 wt. % to 35 wt. %, from 20 wt. % to 30 wt. %, from 25 wt. % to 40 wt. %, from 25 wt. % to 35 wt. %, or from 30 wt. % to 40 wt. % of the ZSM-5 zeolite particles per unit weight of the hybrid catalyst 114.

The red mud particles and ZSM-5 zeolite particles, in the form of a powder or slurry, may be combined with other materials, such as but not limited to binder materials, matrix materials, or other materials, and formed into the composite particles of the hybrid catalyst 114. The combined materials may be extruded to produce the hybrid catalyst 114 in the form of composite particles comprising the red mud particles and the ZSM-5 zeolite particles. In embodiments, hybrid catalyst 114 may be prepared through a spray drying process, which may include forming a slurry comprising the red mud particles, the ZSM-5 zeolite particles, the binder materials, and the matrix materials and then spray drying the slurry to produce the composite particles of the hybrid catalyst 114. In embodiments, the hybrid catalyst 114 may be prepared through extrusion and pelletizing or other process for forming composite catalyst particles.

In embodiments, the hybrid catalyst may comprise from 10 wt. % to 20 wt. % of the binder, per unit weight of the hybrid catalyst. For example, the hybrid catalyst may comprise the binder in amounts of from 10 wt. % to 18 wt. %, from 10 wt. % to 16 wt. %, from 10 wt. % to 14 wt. %, from 12 wt. % to 20 wt. %, from 14 wt. % to 20 wt. %, from 16 wt. % to 20 wt. %, or any combination of these ranges, per unit weight of the hybrid catalyst. The binder materials may comprise silica, alumina, silica-alumina, a clay, or any combinations of these. The alumina may comprise an acid peptized alumina. The silica-alumina may comprise an amorphous silica-alumina.

In embodiments, the hybrid catalyst may comprise from 20 wt. % to 60 wt. % of the matrix material, per unit weight of the hybrid catalyst. For example, the hybrid catalyst may comprise the matrix material in amounts of from 20 wt. % to 55 wt %, from 20 wt. % to 50 wt. %, from 20 wt. % to 45 wt. %, from 20 wt. % to 40 wt. %, from 20 wt. % to 35 wt. %, from 25 wt. % to 60 wt. %, from 30 wt. % to 60 wt. %, from 35 wt. % to 60 wt. %, from 40 wt. % to 60 wt. %, from 45 wt. % to 60 wt. %, or any combination of these ranges, per unit weight of the hybrid catalyst. Matrix materials may include clays, such as but not limited to kaolin, montmorilonite, halloysite, bentonite, or combinations of these. In embodiments, the hybrid catalyst 114 does not include any supplemental catalytic species, such as catalytic metals or catalytic metal oxides, deposited on the surfaces of the composite particles of the hybrid catalyst through a deposition process, such as but not limited to wet impregnation, chemical vapor deposition, or other deposition technique.

The hybrid catalyst 114 may have a catalyst weight ratio of the red mud particles to the ZSM-5 zeolite particles of from 0.1 to 1, where the catalyst weight ratio is a mass of the red mud particles divided by the mass of the ZSM-5 zeolite particles in the hybrid catalyst 114. The catalyst weight ratio may be sufficient to enable cracking of heavy hydrocarbons in the plastic derived oil stream 102 to produce greater value chemicals and intermediates and increase access of the red mud particles to the halogen-containing compounds. The catalyst weight ratio of red mud particles to the ZSM-5 zeolite particles may be sufficient to adsorb halogens onto the surfaces of the red mud particles to reduce the concentration of halogen-containing compounds in the FCC effluent 122. In embodiments, the hybrid catalyst 114 may have a catalyst weight ratio of from 0.1 to 1.0, from 0.1 to 0.9, from 0.1 to 0.8, from 0.1 to 0.7, from 0.1 to 0.6, from 0.1 to 0.5, from 0.1 to 0.4, from 0.2 to 1, from 0.2 to 0.9, from 0.2 to 0.8, from 0.2 to 0.7, from 0.2 to 0.6, from 0.2 to 0.5, or from 0.2 to 0.4, from 0.4 to 1, from 0.4 to 0.9 from 0.4 to 0.8, from 0.4 to 0.7, from 0.5 to 1, from 0.5 to 0.9, from 0.5 to 0.8, from 0.5 to 0.7, or from 0.6 to 1. When the catalyst weight ratio is less than about 0.1, the proportion of the red mud particles in the hybrid catalyst 114 may not be sufficient to effectively remove halogen-containing compounds from the plastic derived oil stream 102. When the catalyst weight ratio is great than about 1, the amount of the ZSM-5 zeolite particles may not be sufficient to produce the desired yield of greater value chemicals and intermediates, such as but not limited to light olefins, light aromatic compounds, light naphtha, jet fuel constituents, or combinations thereof.

The catalyst weight ratio can be modified depending on the properties of the plastic derived oil stream 102, such as the concentration of halogen-containing compounds in the plastic derived oil stream 102, the concentration of heavy compounds in the plastic derived oil stream 102, or combinations of these properties. Heavy compounds refer to compounds in the plastic derived oil stream 102 having boiling point temperatures greater than or equal to about 343 °C. When the concentration of the heavy compounds in the plastic derived oil stream 102 is greater, the hybrid catalyst 114 may be prepared with a greater amount of the ZSM-5 zeolite particles relative to the red mud particles. The increased proportion of the ZSM-5 zeolite particles in the hybrid catalyst 114 may initiate a greater degree of cracking of the heavy compounds in the plastic derived oil stream 102, which may increase the yield of the greater value chemicals and intermediates and may increase the amount of halogen-containing compounds removed from the plastic derived oil stream 102 by making more of the halogen-containing compounds accessible to the red mud particles. Conversely, when the concentration of heavy compounds in the plastic derived oil stream 102 is less, the hybrid catalyst can be prepared with a catalyst weight ratio that is greater, such as by decreasing the amount of the ZSM-5 zeolite particles or increasing the amount of red mud particles in the hybrid catalyst 114. When the concentration of heavy compounds in the plastic derived oil stream 102 is less, then the need for cracking the heavy compounds is less, which requires less of the ZSM-5 zeolite particles in the hybrid catalyst 114.

The catalyst weight ratio of the hybrid catalyst may also be modified based on the concentration of halogen-containing compounds in the plastic derived oil stream 102. For instance, when the concentration of halogen-containing compounds in the plastic derived oil stream 102 is high, then the catalyst weight ratio can be increased, such as by preparing a hybrid catalyst with a greater proportion of red mud particles. Conversely, when the concentration of halogen-containing compounds in the plastic derived oil stream 102 is less, the hybrid catalyst can be made with a greater catalyst weight ratio, such as by increasing an amount of the ZSM-5 zeolite particles relative to the amount of red mud in the hybrid catalyst.

In embodiments, the hybrid catalyst may have a total surface area of from 110 $m^2/g$ to 140 $m^2/g$, such as from 115 $m^2/g$ to 140 $m^2/g$, from 120 $m^2/g$ to 140 $m^2/g$, from 125 $m^2/g$ to 140 $m^2/g$, from 130 $m^2/g$ to 140 $m^2/g$, from 110 $m^2/g$ to 135 $m^2/g$, from 110 $m^2/g$ to 130 $m^2/g$, from 110 $m^2/g$ to 125 $m^2/g$, from 110 $m^2/g$ to 120 $m^2/g$, from 115 $m^2/g$ to 135 $m^2/g$, from 120 $m^2/g$ to 130 $m^2/g$, or about 124 $m^2/g$. In embodiments, the hybrid catalyst may have a total pore volume of from 0.05 $cm^3/g$ to 0.3 $cm^3/g$, such as from 0.075 $cm^3/g$ to 0.3 $cm^3/g$, from 0.1 $cm^3/g$ to 0.3 $cm^3/g$, from 0.125 $cm^3/g$ to 0.3 $cm^3/g$, from 0.15 $cm^3/g$ to 0.3 $cm^3/g$, from 0.175 $cm^3/g$ to 0.3 $cm^3/g$, from 0.2 $cm^3/g$ to 0.3 $cm^3/g$, from 0.05 $cm^3/g$ to 0.275 $cm^3/g$, from 0.05 $cm^3/g$ to 0.25 $cm^3/g$, from 0.05 $cm^3/g$ to 0.225 $cm^3/g$, from 0.05 $cm^3/g$ to 0.2 $cm^3/g$, from 0.05 $cm^3/g$ to 0.175 $cm^3/g$, from 0.1 $cm^3/g$ to 0.2 $cm^3/g$, from 0.15 $cm^3/g$ to 0.2 $cm^3/g$, or about 0.172 $cm^3/g$. In embodiments, the hybrid catalyst may have an average pore size of from 40 nm to 70 nm, such as from 40 nm to 65 nm, from 40 nm to 60 nm, from 45 nm to 70 nm, from 50 nm to 70 nm, from 45 nm to 65 nm, from 50 nm to 60 nm, from 52 nm to 58 nm, or about 55 nm.

The FCC reactor 112 may be configured to contact the plastic derived oil stream 102 with the hybrid catalyst 114 at a temperature of from 500 degrees Celsius (C) to 700 °C, such as from 500 °C to 650 °C, from 500 °C to 600 °C, from 550 °C to 700 °C, from 550 °C to 650 °C, from 550 °C to 600 °C, or from 600 °C to 700 °C. The FCC reactor 112 may be configured to contact the plastic derived oil stream 102 with the hybrid catalyst 114 at a pressure of from 101 kilopascals (kPa) to 303 kPa, such as from 125 kPa to 303 kPa, from 150 kPa to 303 kPa, from 200 kPa to 303 kPa, from 250 kPa to 303 kPa, from 101 kPa to 250 kPa, from 101 kPa to 200 kPa, from 101 kPa to 150 kPa, at atmospheric pressure (~101 kPa), or any combination of these ranges. In embodiments, the FCC reactor 112 may be configured to contact the plastic derived oil stream 102 with the hybrid catalyst 114 at a gas hourly space velocity (GHSV) of from 0.2 $h^{-1}$ to 100 $h^{-1}$, such as from 1 $h^{-1}$ to 100 $h^{-1}$, from 5 $h^{-1}$ to 100 $h^{-1}$, from 10 $h^{-1}$ to 100 $h^{-1}$, from 25 $h^{-1}$ to 100 $h^{-1}$, from 50 $h^{-1}$ to 100 $h^{-1}$, from 0.2 $h^{-1}$ to 80 $h^{-1}$, from 0.2 $h^{-1}$ to 50 $h^{-1}$, from 0.2 $h^{-1}$ to 25 $h^{-1}$, from 0.2 $h^{-1}$ to 10 $h^{-1}$, or any combinations of these ranges. In embodiments, the FCC reactor 112 may be operable to contact the plastic derived oil stream 102 with the hybrid catalyst 114 at a catalyst-to-oil weight ratio of greater than or equal to 2, such as from 2 to 40, from 2 to 35, from 2 to 30, from 2 to 25, from 2 to 20, from 2 to 15, from 2 to 12, from 2 to 10, from 2 to 8, from 4 to 10, from 4 to 40, from 8 to 40, from 15 to 40, from 20 to 40, from 30 to 40, or any combination of these ranges. The catalyst-to-oil weight ratio in the FCC reactor 112 is equal to an average ratio of a mass flow rate of the hybrid catalyst 114 through the FCC reactor 112 divided by a mass flow rate of the hydrocarbons in the FCC reactor 112 during steady state operation of the FCC system 100.

The catalyst-to-oil weight ratio in the FCC reactor 112 may be adjusted based on the concentration of halogen-containing compounds in the plastic derived oil stream 102. In particular, the catalyst-to-oil weight ratio in the FCC reactor 112 may be increased in response to greater concentrations of halogen-containing compounds in the plastic derived oil stream 102 and reduced in response to lesser concentrations of halogen-containing compounds in the plastic derived oil stream 102. In embodiments, the processes herein may include adjusting the catalyst-to-oil weight ratio in the FCC reactor 112 based on a concentration of halogen-containing compounds in the plastic derived oil stream 102. Adjusting the catalyst-to-oil weight ratio in the FCC reactor 112 may include determining a concentration of halogen-containing compounds in the plastic derived oil stream 102 and adjusting a mass flow rate of the plastic derived oil stream 102, a mass flow rate of the hybrid catalyst 114, or both to the FCC reactor 112. The catalyst-to-oil weight ratio in the FCC reactor 112 may be adjusted in proportion to the concentration of halogen-containing compounds in the plastic derived oil stream 102.

In embodiments, the FCC effluent 122 may be separated from the used hybrid catalyst 124 at or proximate to an outlet end of the FCC reactor 112. Referring again to FIG. 1, in embodiments, the reaction mixture, which may include the FCC effluent 122 and the used hybrid catalyst 124, may be passed out of the FCC reactor 112 to the fluid-solid separation unit 120. As previously discussed, the fluid-solid separation unit 120 may be disposed at the outlet end of the FCC reactor 112. The fluid-solid separation unit 120 may be configured to separate the FCC effluent 122 from the solid particles of the used hybrid catalyst 124. The FCC effluent 122 is in a fluid phase (generally a vapor phase at the reaction conditions of the FCC reactor). In FIG. 1, the fluid-solid separation unit 120 is depicted as a vessel disposed at the outlet end of the FCC reactor 112, where the vessel reduces the fluid velocity in a manner that allows the solid particles of the used hybrid catalyst 124 to separate and settle out from the fluid phase of the FCC effluent 122. The used hybrid catalyst 124 may settle in the bottom of the fluid-solid separation unit 120, and the FCC effluent 122 may pass out of a top portion of the fluid-solid separation unit 120. In embodiments, the fluid-solid separation unit 120 may further include one or more downstream cyclones, filters, or other unit operation (not shown) that may be configured to remove catalyst fines from the FCC effluent 122. Other types of fluid-solid separation devices are contemplated for the fluid-solid separation unit 120. The used hybrid catalyst 124 may be passed from the fluid-solid separation unit 120 to the catalyst regenerator 130.

Referring again to FIG. 1, as previously discussed, the FCC system 100 includes the catalyst regenerator 130. The used hybrid catalyst 124 may be passed from the fluid-solid separation unit 120 to the catalyst regenerator 130 and regenerated to produce a regenerated hybrid catalyst 132. The regenerated hybrid catalyst 132 may be passed back to the FCC reactor 112 as at least a portion of or all of the hybrid catalyst 114. The catalyst regenerator 130 may be disposed downstream of the solid-fluid separation unit 120 and in fluid communication with an outlet of the solid-fluid separation unit 120 to pass the used hybrid catalyst 124 from the solid-fluid separation unit 120 directly to the catalyst regenerator 130.

During the reactions in the FCC reactor 112, halogen-containing compounds in the plastic derived oil stream 102 react with the red mud particles in the hybrid catalyst 114 to convert the halogen-containing compounds to hydrogen halides and hydrocarbons. The hydrogen halides are then adsorbed onto the surfaces of the red mud particles. Adsorption of the hydrogen halides onto the red mud particles forms metal halides at the surfaces of the red mud particles. As an example, when the red mud particles include CaO, adsorption of the HCl onto the red mud particles to form metal halides is illustrated in chemical reaction 1 (RXN 1).

$$CaO + 2HCl \longrightarrow CaCl_2 + H_2O \qquad \text{RXN 1}$$

The chemical reaction of HCl with CaO is provided for purposes of illustration, but is not intended to limit the composition of the red mud particles in any way. Depending on the metal oxides present in the red mud particles, the resulting metal halides adsorbed onto the surfaces of the red mud particles can have different thermal stability.

Also, during the reactions in the FCC reactor 112, coke may deposit on the used hybrid catalyst 124 as a result of the cracking reactions. The coke may block reactive sites on the ZSM-5 zeolite and reduce the catalytic activity of the ZSM-5 zeolite for catalyzing the cracking reactions.

The catalyst regenerator 130 may be configured to heat the used hybrid catalyst 124 to a temperature sufficient to desorb the halogens from the red mud particles and remove coke from the hybrid catalyst 124 to produce the regenerated hybrid catalyst 132. In embodiments, the catalyst regenerator 130 may be configured to contact the used hybrid catalyst 124 with the regeneration gas 134 at the regeneration temperature, which may be sufficient to desorb the halogens from the red mud particles, combust coke deposits on the used hybrid catalyst 124, increase the temperature of the regenerated hybrid catalyst 132, or combinations thereof.

Desorption of the halogens from the red mud particles may produce halogen compounds, such as but not limited to halogen gases (such as chlorine gas ($Cl_2$)), halogen halides (such as HCl), or combinations of these. The catalyst regenerator 130 may be configured to contact the used hybrid catalyst 124 with a regeneration gas 134, such as a gas containing oxygen, at a regeneration temperature sufficient to convert the metal halides to the halogen compounds. As an example, the reaction for $CaCl_2$) with oxygen gas to produce chlorine gas and CaO is provided in chemical reactions 2 (RXN 2).

$$2CaCl_2 + O_2 \longrightarrow 2CaO + 2Cl_2 \qquad \text{RXN 2}$$

Similar reactions may occur with other metal halides on the surfaces of the red mud particles. Without being bound by any particular theory, it is believed that the increased temperature in the catalyst regenerator 130 and contact with the regeneration gas 134 may cause the metal halides at the surface of the red mud particles to become unstable, leading to conversion of the metal halides back to halogen gases, hydrogen halides, or other halogen compounds and removal of the halogen compounds from the surfaces of the red mud particles.

The regeneration temperature in the catalyst regenerator 130 may also be sufficient to combust the coke deposits, increase the temperature of the catalyst particles, or both to produce the regenerated hybrid catalyst 132. The regeneration gas 134 may be an oxygen-containing gas, such as but not limited to air. In embodiments, the regeneration gas 134 may include a fuel gas in addition to the oxygen-containing gas. The fuel gas may be added to increase the heat produced in the catalyst regenerator 130, which can increase combustion of coke deposits, further increase the temperature of the cracking catalyst, or both.

In embodiments, the regeneration temperature in the catalyst regenerator 130 may be greater than the operating temperature of the FCC reactor 112. In embodiments, the regeneration temperature in the catalyst regenerator 130 may be from 500 °C to 900 °C, such as from 500 °C to 800 °C, from 500 °C to 750 °C, from 550 °C to 900 °C, from 550 °C to 800 °C, or from 550 °C to 750 °C.

Combustion gases produced through combustion of the coke deposits, and optionally any supplemental fuels added to the catalyst regenerator 130, may be passed out of the catalyst regenerator 130 in a flue gas 136. The flue gas 136 may also carry the halogen compounds desorbed from the red mud particles out of the catalyst regenerator 130. The flue gas 136 may exit from a top portion of the catalyst regenerator 130. The flue gas 136 comprising the halogen compounds (e.g., $Cl_2$, HCl, or other halogen-containing compounds) and combustion gases may be passed to one or more downstream treatment systems for properly handling of the halogen compounds and combustion gases to reduce environmental impact, such as through acid gas removal systems, scrubbing, carbon capture, and the like.

The removal of the halogens, such as but not limited to chlorine, and coke deposits from the used hybrid catalyst 124 produces the regenerated hybrid catalyst 132. The regenerated hybrid catalyst 132 may have a concentration of halogens less than the concentration of halogens in the used hybrid catalyst 124. In embodiments, the regenerated hybrid catalyst 132 may have a concentration of halogens of less than or equal to 10 parts per million by weight (ppmw), such as less than or equal to 5 ppmw, less than or equal to 1 ppmw, from 0.001 ppmw to 10 ppmw, from 0.001 ppmw to 5 ppmw, or from 0.001 ppmw to 1 ppmw. Referring again to FIG. 1, the catalyst regenerator 130 may be in fluid communication with the inlet end of the FCC reactor 112 to pass the regenerated hybrid catalyst 132 back to the FCC reactor 112. The system 100 may further include a regenerated hybrid catalyst transfer line 138 fluidly coupling the catalyst regenerator 130 and the inlet of the FCC reactor 112. The regenerated hybrid catalyst transfer line 138 may be operable to pass the regenerated hybrid catalyst 132 from the catalyst regenerator 130 to the FCC reactor 112. In embodiments, the system 100 may further include a catalyst valve 140 disposed in the regenerated hybrid catalyst transfer line 138 and operable to control a mass flow rate of the regenerated hybrid catalyst 132 from the catalyst regenerator 170 to the FCC reactor 112.

The FCC effluent 122 may have a concentration of halogen-containing compounds less than the plastic derived oil stream 102 upstream of the FCC reactor 112. In embodiments, the FCC effluent 122 may have a concentration of halogen-containing compounds of less than or equal to 100 ppmw, such as less than or equal to 50 ppmw, less than or equal to 20 ppmw, less than or equal to 10 ppmw. In embodiments, the FCC reactor effluent 122 may have a concentration of halogen-containing compounds of from 0.1 ppmw to 100 ppmw, from 0.1 ppmw to 80 ppmw, from 0.1 ppmw to 50 ppmw, from 0.1 ppmw to 20 ppmw, from 0.1 ppmw to 10 ppmw, from 1 ppmw to 100 ppmw, from 1 ppmw to 80 ppmw, from 1 ppmw to 50 ppmw, from 1 ppmw to 20 ppmw, from 1 ppmw to 10 ppmw, from 5 ppmw to 100 ppmw, from 5 ppmw to 80 ppmw, from 5 ppmw to 50 ppmw, from 5 ppmw to 20 ppmw, from 5 ppmw to 10 ppmw, from 10 ppmw to 100 ppmw, from 10 ppmw to 80 ppmw, from 10 ppmw to 50 ppmw, from 10 ppmw to 20 ppmw, from 20 ppmw to 100 ppmw, from 20 ppmw to 80 ppmw, from 20 ppmw to 50 ppmw, from 50 ppmw to 100 ppmw, or from 50 ppmw to 80 ppmw based on the unit weight of the FCC effluent 122.

The FCC effluent 122 may comprise fuel gases, light olefins, $C_2$-$C_4$ alkanes, light aromatic compounds, light naphtha, jet fuel constituents, diesel constituents, heavy compounds, or any combination of these constituents. For purposes of the present disclosure, the terms "light naphtha range hydrocarbons" and "light naphtha" refer to hydrocarbons having boiling point temperatures of from 0 °C to 150 °C, the terms "jet fuel constituents" and "jet fuel" refers to hydrocarbons having boiling point temperatures of from 150 °C to 300 °C, the terms "diesel" and "diesel constituents" refers to hydrocarbons having boiling point temperatures of from 300 °C to 343 °C, and the term "heavy compounds" refers to hydrocarbons having boiling point temperatures greater than 343 °C. The FCC effluent 122 may comprise a greater concentration of light olefins, light aromatic compounds, light naphtha range hydrocarbons, or combinations of these constituents compared to the plastic derived oil stream 102. The FCC effluent 122 may have reduced concentrations of jet fuel constituents, diesel constituents, and heavy compounds compared to the plastic derived oil stream 102 introduced to the FCC reactor 112.

In embodiments, the FCC effluent 122 may comprise constituents having boiling point temperatures less than or equal to 300 °C. A yield of constituents having boiling point temperatures less than or equal to 300 °C in the FCC effluent 122 may be greater than or equal to 75 wt. %, such as greater than or equal to 80 wt. %, such as from 75 wt. % to 100 wt. %, or from 80 wt. % to 95 wt. % based on the mass flow rate of the plastic derived oil 102 introduced to the FCC reactor 112. The yield of a constituent in the FCC effluent 122 may be equal to 100 times the mass flow rate of the constituents in the FCC effluent 122 divided by the total mass flow rate of the plastic derived oil stream 102 introduced to the FCC reactor 112. In embodiments, the FCC effluent 122 may comprise greater than or equal to 75 wt. %, such as greater than or equal to 80 wt. %, from 75 wt. % to 100 wt. %, or from 80 wt. % to 95 wt. % of the constituents having boiling point temperatures less than or equal to 300 °C based on the total weight of the FCC effluent 122.

In embodiments, a yield of light olefins, such as but not limited to ethylene, propylene, mixed butenes, and combinations thereof, in the FCC effluent 122 may be from 10 wt. % to 50 wt. %, from 10 wt. % to 40 wt. %, from 10 wt. % to 30 wt. %, from 12 wt. % to 50 wt. %, from 12 wt. % to 40 wt. %, from 15 wt. % to 50 wt. %, from 15 wt. % to 30 wt. %, from 20 wt. % to 50 wt. %, or from 30 wt. % to 50 wt. % based on the mass flow rate of the plastic derived oil 102 introduced to the FCC reactor 112. In embodiments, the FCC effluent 122 may comprise from 10 wt. % to 50 wt. %, from 10 wt. % to 40 wt. %, from 12 wt. % to 50 wt. %, from 12 wt. % to 40 wt. %, from 15 wt. % to 50 wt. %, from 15 wt. % to 40 wt. %, from 20 wt. % to 50 wt. %, or from 20 wt. % to 40 wt. % of the light olefins based on the mass flow rate of the FCC effluent 122.

In embodiments, a yield of light olefins and light naphtha in the FCC effluent 122 may be greater than or equal to 30 wt. %, such as greater than or equal to 35 wt. %, greater than or equal to 40 wt. %, greater than or equal to 45 wt. %, greater than or equal to 50 wt. %, greater than or equal to 55 wt. %, from 30 wt. % to 75 wt. %, from 40 wt. % to 75 wt. %, from 45 wt. % to 75 wt. %, from 50 wt. % to 70 wt. %, or from 47 wt. % to 61 wt. % based on the mass flow rate of the plastic derived oil stream 102 introduced to the FCC reactor 112. In embodiments, the FCC effluent 122 may comprise at least 30 wt. % of the light olefins and light naphtha constituents based on the mass flow rate of the FCC effluent 122. In embodiments, the FCC effluent 122 may comprise at least 35 wt. %, at least 40 wt. %, at least 45 wt. %, at least 50 wt. %, from 30 wt. % to 75 wt. %, from 40 wt. % to 75 wt. %, from 45 wt. % to 75 wt. %, from 50 wt. % to 70 wt. %, or from 47 wt. % to 61 wt. % of the light olefins and light naphtha based on the mass flow rate of the FCC effluent 122

In embodiments, a yield of light naphtha in the FCC effluent 122 may be from 20 wt. % to 40 wt. %, from 20 wt.

% to 35 wt. %, from 25 wt. % to 40 wt. %, from 25 wt. % to 35 wt. %, from 28 wt. % to 40 wt. %, or from 26 wt. % to 30 wt. % based on the mass flow rate of the plastic derived oil 102 introduced to the FCC reactor 112. In embodiments, the FCC effluent 122 may comprise from 20 wt. % to 40 wt. %, from 20 wt. % to 35 wt. %, from 25 wt. % to 40 wt. %, from 25 wt. % to 35 wt. %, from 28 wt. % to 40 wt. %, or from 26 wt. % to 30 wt. % light naphtha based on the mass flow rate of the FCC effluent 122.

In embodiments, a yield of jet fuel constituents in the FCC effluent 122 may be from 10 wt. % to 40 wt. %, from 10 wt. % to 35 wt. %, from 10 wt. % to 32 wt. %, from 10 wt. % to 30 wt. %, from 10 wt. % to 25 wt. %, from 15 wt. % to 40 wt. %, from 15 wt. % to 35 wt. %, from 15 wt. % to 32 wt. %, from 15 wt. % to 30 wt. %, from 15 wt. % to 25 wt. %, from 20 wt. % to 40 wt. %, from 20 wt. % to 35 wt. %, from 20 wt. % to 34 wt. %, from 20 wt. % to 30 wt. %, from 20 wt. % to 25 wt. %, from 25 wt. % to 40 wt. %, from 25 wt. % to 35 wt. %, from 25 wt. % to 34 wt. %, or from 21 wt. % to 34 wt. % based on the mass flow rate of the plastic derived oil 102 introduced to the FCC reactor 112. In embodiments, the FCC effluent 122 may comprise from 10 wt. % to 40 wt. %, from 10 wt. % to 35 wt. %, from 10 wt. % to 32 wt. %, from 10 wt. % to 30 wt. %, from 10 wt. % to 25 wt. %, from 15 wt. % to 40 wt. %, from 15 wt. % to 35 wt. %, from 15 wt. % to 32 wt. %, from 15 wt. % to 30 wt. %, from 15 wt. % to 25 wt. %, from 20 wt. % to 40 wt. %, from 20 wt. % to 35 wt. %, from 20 wt. % to 34 wt. %, from 20 wt. % to 30 wt. %, from 20 wt. % to 25 wt. %, from 25 wt. % to 40 wt. %, from 25 wt. % to 35 wt. %, from 25 wt. % to 34 wt. %, or from 21 wt. % to 34 wt. % jet fuel constituents based on the mass flow rate of the FCC effluent 122.

In embodiments, a yield of constituents having boiling point temperature greater than 300 °C may be less than or equal to 20 wt. %, less than 15 wt. %, from greater than 0 (zero) wt. % to less than 20 wt. %, from greater than 0 wt. % to less than 15 wt. %, from 0.01 wt. % to 20 wt. %, or even from 0.01 wt. % to 15 wt. % based on the mass flow rate of the plastic derived oil stream 102 introduced to the FCC reactor 112. In embodiments, the FCC effluent 122 may comprise less than or equal to 20 wt. %, less than 15 wt. %, less than 13 wt. %, less than 12 wt. %, less than 10 wt. %, from greater than 0 (zero) wt. % to less than 20 wt. %, from greater than 0 wt. % to less than 15 wt. %, from 0.01 wt. % to 20 wt. %, or even from 0.01 wt. % to 15 wt. % constituents having boiling point temperatures greater than 300 °C, based on the mass flow rate of the FCC effluent 122. In embodiments, a yield of solid coke from the process may be less than or equal to 5 wt. %, less than or equal to 4 wt. %, from greater than 0 (zero) wt. % to less than 5 wt. %, from greater than 0 wt. % to less than 4 wt. %, from 0.01 wt. % to 5 wt. %, or even from 0.01 wt. % to 4 wt. % solid coke based on the mass flow rate of the plastic derived oil stream 102 to the FCC reactor 112.

Referring again to FIG. 1, the FCC effluent 122 may be passed to the effluent separation system 150. In embodiments, the FCC effluent 122 may be passed directly from the fluid-solid separation unit 120 to the effluent separation system 150. The FCC effluent 122 may be separated in the effluent separation system 150 to produce at least one product stream. The effluent separation system 150 may be disposed downstream of the FCC reactor 112, such as downstream of the fluid-solid separation unit 120. The effluent separation system 150 can include one or a plurality of separation units, which, collectively, operate to separate the FCC effluent 122 into the plurality of product streams. In embodiments, the effluent separation system 150 may include one or more fractionation units. Other types of separation units are contemplated, such as but not limited to extraction units, distillation units, crystallization units, or other separation unit operations. The effluent separation system 150 may be in fluid communication with the fluid-solid separation unit 120 to pass the FCC effluent 122 directly to the effluent separation system 150.

The plurality of product streams can include one or more of a light olefin stream 152, a light naphtha stream 154, a jet fuel stream 156, a diesel stream 158, a heavy bottom stream 160, or any combination of these streams. The light olefin stream 152 can include one or more olefin streams comprising olefin compounds having from 2-4 carbon atoms. The light olefin streams 152 may include an ethylene stream, a propylene stream, a mixed butenes stream, or combinations of these. The light naphtha stream 154 may comprise constituents having boiling point temperatures of from 0 °C to 150 °C. The naphtha stream may contain light aromatic compounds (aromatic compounds having from 6-8 carbon atoms) and gasoline components. The light aromatics stream 154 may include aromatic compounds having from 6 to 8 carbon atoms, such as benzene, toluene, xylenes, and/or ethylbenzene, which may be used as chemical intermediates for producing circular polymer materials (polymers made from recovered hydrocarbons instead of hydrocarbons produced from subterranean sources and therefore having a lower environmental footprint). In embodiments, the plurality of product streams may include the jet fuel stream 156, which may include constituents having boiling point temperatures of from 150 °C to 300 °C. In embodiments, the plurality of product streams may include the diesel stream 158, which may include constituents having boiling point temperatures of from 300 °C to 343 °C. The heavy bottom stream 160 may comprise heavy compounds, such as hydrocarbon compounds having boiling point temperatures greater than 343 °C. In embodiments, the effluent separation system 150 further may be operable to produce a light gas stream (not shown) comprising light gases such as but not limited to hydrogen, methane, or both produced in the FCC reactor 112. In embodiments, the effluent separation system 150 may be further operable to produce a light paraffin stream (not shown) comprising saturated hydrocarbons having from 2 to 4 carbon atoms (ethane, propane, butane, and isobutane). In embodiments, the product streams may further include a light gas stream comprising methane, hydrogen, and other light gases. Other product streams may be produced by the effluent separation system 150.

Referring again to FIG. 1, the system 100 can be used in a process for upgrading plastic derived oil. The processes for upgrading the plastic derived oil includes contacting the plastic derived oil stream 102 with the hybrid catalyst 114 in the FCC reactor 112 at reaction conditions. The hybrid catalyst 114 comprises red mud particles and ZSM-5 zeolite particles. Contact of the plastic derived oil stream 102 with the hybrid catalyst 114 at reaction conditions produces the FCC effluent 122 having reduced concentrations of halogen-containing compounds compared to the plastic derived oil stream 102 and greater concentrations of light olefins and light naphtha compared to the plastic derived oil stream 102. The FCC system 110 and the FCC reactor 112 may have any of the features, configurations, or operating conditions described in the present disclosure for the FCC system 110 and FCC reactor 112, respectively. The red mud particles of the hybrid catalyst 114 may react with halogen-containing compounds to produce hydrogen halides, and the hydrogen halides may then be adsorbed by the metal oxides of the red mud particles. Additionally, the ZSM-5 zeolite particles in the hybrid catalyst 114 may contact heavy hydrocarbon molecules in the plastic derived oil stream 102 and crack at least a portion of the heavy hydrocarbon molecules, which may improve greater access to the halogen-containing compounds by the red mud particles as well as produce greater value chemicals and intermediates, such as the light olefins, light naphtha, and jet fuel constituents.

The processes may further include separating the FCC effluent 122 from the used hybrid catalyst 124 downstream of the FCC reactor 112. Separating the FCC effluent 122 from the used hybrid catalyst 124 may be accomplished by the fluid-solid separation unit 120 disposed at the outlet end of the FCC reactor 112. The processes may include passing the contents of the FCC reactor 112 to the fluid-solid separation unit 120 that separates the contents of the FCC reactor 112 into the FCC effluent 122 from the used hybrid catalyst 124. The FCC effluent 122 may comprise light olefins, light naphtha, jet fuel constituents, diesel constituents, or combinations of these constituents. The FCC effluent 122 may have a greater concentration of light olefins, such as but not limited to ethylene, propylene, or both; light naphtha; jet fuel constituents; diesel constituents; or combinations thereof compared the plastic derived oil stream 102.

The processes of the present disclosure may include passing the used hybrid catalyst 124 to the catalyst regenerator 130, and regenerating the used hybrid catalyst 124 in the catalyst regenerator 130 to produce the regenerated hybrid catalyst 132. The regenerated hybrid catalyst 132 may have a reduced concentration of halogens compared to the used hybrid catalyst 124 prior to regeneration. The regenerated hybrid catalyst 132 may also have reduced coke deposits, greater temperature, or both compared to the used hybrid catalyst 124 prior to regeneration. In embodiments, regenerating the used hybrid catalyst 132 may include contacting the used hybrid catalyst 132 with the regeneration gas 134 at a regeneration temperature sufficient to convert metal halides at the surface of the red mud particles to halogen compounds, such as but not limited to $Cl_2$ and other halogen gases, and sufficient to remove coke deposits from the hybrid catalyst, increase the temperature of the hybrid catalyst, or both. In embodiments, the regeneration gas 134 may be an oxygen-containing gas, such as but not limited to air. In embodiments, regenerating the used hybrid catalyst 132 may include contacting the used hybrid catalyst 132 with the regeneration gas 134 in the catalyst regenerator 130 at the regeneration temperature that is greater than the operating temperature of the FCC reactor 112, such as at a regeneration temperature of from 500 °C to 800 °C, from 500 °C to 750 °C, from 500 °C to 700 °C, from 550 °C to 800 °C, from 550 °C to 750 °C, from 550 °C to 700 °C, from 600 °C to 800 °C, from 600 °C to 750 °C, from 600 °C to 700 °C, or from 650 °C to 800 °C. In embodiments, the regeneration gas 134 for the catalyst regenerator 130 may also include a fuel gas or a fuel oil. Combustion of the fuel gas and/or fuel oil in the catalyst regenerator 130 may increase the heat generated in the catalyst regenerator 130, thereby increasing the regeneration temperature in the catalyst regenerator 130.

The processes may further include passing a flue gas 136 out of the catalyst regenerator 130, wherein the flue gas 136 may comprise halogen compounds, such as but not limited to $Cl_2$ or HCl. The flue gas 136 may also include unreacted regeneration gases and combustion gases produced from combustion of the coke deposits and any fuel gases added to the catalyst regenerator 130. The processes may include passing the flue gas 136 to a downstream treatment system for properly handling the hydrogen halides in the flue gas 136. The catalyst regenerator 130 may have any of the other features, configuration, or operating conditions described herein for the catalyst regenerator 130.

Referring again to FIG. 1, the processes disclosed herein may include combining the plastic derived oil stream 102 and the hybrid catalyst 114, such as the regenerated hybrid catalyst 132, at the inlet end of the FCC reactor 112, where the plastic derived oil stream 102 and the hybrid catalyst 114 may be contacted and may travel together through the FCC reactor 112. In embodiments, the processes may include contacting the plastic derived oil stream 102 and the hybrid catalyst 114 in the FCC reactor 112 at a reaction temperature of from 500 °C to 700 °C, such as from 500 °C to 650 °C, from 500 °C to 600 °C, from 550 °C to 650 °C, from 550 °C to 600 °C, or from 600 °C to 650 °C. The plastic derived oil stream 102 and the hybrid catalyst 114 may be contacted in the FCC reactor 112 at a pressure of from 100 kPa to 1000 kPa, from 100 kPa to 303 kPa, or at about atmospheric pressure (i.e., about 101.3 kPa). The processes may include contacting the plastic derived oil stream 102 and the hybrid catalyst 114 in the FCC reactor 112 at a GHSV of from 0.2 $h^{-1}$ to 100 $h^{-1}$.

The plastic derived oil stream 102 and the hybrid catalyst 114 may be introduced to the FCC reactor 112 at a catalyst-to-oil weight ratio of greater than or equal to 2. The catalyst-to-oil weight ratio in the FCC reactor 112 is equal to a mass flow rate of the hybrid catalyst 114 divided by a mass flow rate of the plastic derived oil stream 102 in the FCC reactor 112 during steady state operation. In embodiments, catalyst-to-oil weight ratio in the FCC reactor 112 may be from 2 to 40, from 2 to 35, from 2 to 30, from 2 to 25, from 2 to 20, from 2 to 15, from 2 to 12, from 2 to 10, from 2 to 8, from 4 to 10, from 4 to 40, from 8 to 40, from 15 to 40, from 20 to 40, from 30 to 40, or any combination of these ranges. In embodiments, the FCC effluent 122 may comprise less than 100 ppmw halogen-containing compounds based on the total weight of the FCC effluent 122, such as less than 50 ppmw, less than 40 ppmw, less than 30 ppmw, or even less than 20 ppmw halogen-containing compounds based on the total weight of the FCC effluent 122.

The catalyst-to-oil weight ratio in the FCC reactor 112 may be adjusted based on the concentration of halogen-containing compounds in the plastic derived oil stream 102. Specifically, the catalyst-to-oil weight ratio in the FCC reactor 112 can be increased when the concentration of halogen-containing compounds in the plastic derived oil stream 102 increases and decreased when the concentration of halogen-containing compounds in the plastic derived oil stream 102 decreases. In embodiments, the methods and processes disclosed herein may include adjusting the catalyst-to-oil weight ratio in the FCC reactor 112 based on the concentration of the halogen-containing compounds in the plastic derived oil stream 102 passed to the FCC reactor 112. In embodiments, adjusting the weight ratio of catalyst-to-oil in the FCC reactor 112 may include determining a concentration of the halogen-containing compounds in the plastic derived oil stream 102 and adjusting a mass flow rate of the plastic derived oil stream 102 to the FCC reactor 112, a mass flow rate of the hybrid catalyst 114 to the FCC reactor 112, or both, to adjust the catalyst-to-oil weight ratio. The weight ratio of catalyst-to-oil may be adjusted in proportion to the concentration of halogen-containing compounds in the plastic derived oil stream 102.

The processes of the present disclosure may further include separating the FCC effluent 122, in the effluent separation system 150 to produce a plurality of product streams, such as but not limited to an ethylene stream, a propylene stream, a mixed butenes stream, a light naphtha stream, a jet fuel stream, a diesel stream, or combinations of these product streams. In embodiments, the product streams may include one or more light olefin streams 152, a light naphtha stream 154, a jet fuel stream 156, a diesel stream 158, a heavy bottom stream 160, or any combinations of these product streams.

The process may include providing the plastic derived oil stream 102 comprising hydrocarbons and from 10 parts per million by weight (ppmw) to 500 ppmw of halogen-containing compounds based on the total weight of the plastic derived oil stream 102. In embodiments, the processes may include producing the plastic derived oil stream 102 from solid waste plastic. Producing the plastic derived oil stream 102 may include passing solid waste plastic to a dehalogenation unit 10, which melts the solid waste plastic and removes some halogen compounds from the solid waste plastic to produce the liquefied plastic stream 14. The processes may further include passing the liquefied plastic stream 14 to the pyrolysis unit 20 and subjecting the liquefied plastic stream 14 to pyrolysis in the pyrolysis unit 20 to produce the plastic derived oil stream 102.

Referring again to FIG. 2, in embodiments, the plastic derived oil stream 102 from the pyrolysis reactor 20 may have a concentration of inorganic contaminants, polar contaminants, halogen-containing compounds, or combinations thereof that is great enough to cause problems in the FCC system 110, such as but not limited to deactivation of the hybrid catalyst 114, rapid saturation of the red mud particles in the hybrid catalyst 114, rapid corrosion of equipment, or other problems. Thus, the plastic derived oil stream 102 may be treated upstream of the FCC system 110 to reduce the concentration of contaminants in the plastic derived oil stream 102 to produce a treated plastic derived oil 192, which may then be passed to the FCC system 110. In embodiments, the system 100 may include a water wash unit 180 and an adsorption unit 190, which are both disposed upstream of the FCC system 110 and downstream of the pyrolysis reactor 20.

The wash water unit 180 may be disposed downstream of the pyrolysis reactor 20. All or a portion of the plastic derived oil stream 102 may be passed from the pyrolysis reactor 20 to the wash water unit 180, such as being passed directly from the pyrolysis reactor 20 to the wash water unit 180. The wash water unit 180 may include one or a plurality of units operable to contact the plastic derived oil stream 102 with wash water 182 and then to separate the aqueous phase from the oil phase to produce a washed plastic derived oil 184 and used wash water 186. The methods disclosed herein may include washing the plastic derived oil stream 102 with the wash water 182 in the water wash unit 180 upstream of the FCC system 110. Washing the plastic derived oil stream 102 with the wash water 180 may remove inorganic and polar contaminants from the plastic derived oil stream 102 to produce the washed plastic derived oil 184. The washed plastic derived oil 184 may have a reduced concentration of inorganic contaminants, polar contaminants, halogen compounds, or combinations of these compared to the plastic derived oil stream 102. The used wash water 186 may be passed to one or more downstream unit operations to treat the used wash water 186. The washed plastic derived oil 184 may be passed out of the water wash unit 180.

The washed plastic derived oil 184 may be passed from the wash water unit 180 to the adsorption unit 190, which may be disposed downstream of the wash water unit 180 and upstream of the FCC system 110. The adsorption unit 190 may comprise one or more adsorbent beds containing an adsorbent material. The adsorbent materials may be any adsorbents suitable for adsorbing halogen-containing compounds. The adsorption unit 190 may be operable to contact the washed plastic derived oil 184 with the adsorbents, which may adsorb additional halogen-containing compounds, such as organochloride compounds or other contaminants, from the washed plastic derived oil 184 to produce the treated plastic derived oil 192. The methods disclosed herein may include contacting the washed plastic derived oil 184 with the adsorbents in the adsorption unit 190, where contact with the adsorbent removes at least a portion of the halogen-containing compounds and other contaminants from the washed plastic derived oil 184 to produce the treated plastic derived oil 192.

The steps of washing the plastic derived oil stream 102 with the wash water 182 and treating the washed plastic derived oil 184 in the adsorption unit 190 may be employed depending on the concentration of halogens and other contaminants in the plastic derived oil stream 102. In embodiments, the water wash unit 180 and the upstream adsorption unit 190 may be utilized when the concentration of halogen-containing compounds in the plastic derived oil stream 102 exceeds a threshold concentration of the halogen-containing compounds. In embodiments, the threshold concentration of the halogen-containing compounds may be 500 ppmw, 400 ppmw, 300 ppmw, 200 ppmw, or 100 ppmw based on the unit weight of the plastic derived oil stream 102. Treating the washed plastic derived oil 184 in the upstream adsorption unit 190 may further reduce the concentration of the halogen-containing compounds in the plastic derived oil stream 102 to reduce the burden on the hybrid catalyst 114 in the FCC system 110.

EXAMPLES

The various embodiments of systems and processes of the present disclosure will be further clarified by the following examples. The examples are illustrative in nature, and should not be understood to limit the subject matter of the present disclosure.

Example 1: Preparation of the Hybrid Catalyst

In Example 1, the hybrid catalyst of the present disclosure was synthesized. A hybrid catalyst comprising red mud and ZSM-5 zeolite was prepared by spray drying. First, 200 grams (g) (dry basis) of kaolin clay powder was mixed with 431.92 g of deionized water to form a kaolin slurry. Separately, 100 g (dry basis) of red mud and 100 g (dry basis) of ZSM-5 zeolite was mixed with 462.59 g deionized water and stirred for 10 minutes (min) to form a red mud-ZSM-5 zeolite slurry. The red mud was obtained from Ma'aden Aluminum Company, based in Ras Al Khair, Saudi Arabia. The ZSM-5 zeolite was obtained from Zeolyst International. The red mud particles had a total surface area of 28.77 $m^2/g$, a total pore volume of 0.084 $cm^3/g$, and an average pore size of 117.63 nm. The ZSM-5 zeolite particles had a total surface area of 105.44 $m^2/g$, a total pore volume of 0.125 $cm^3/g$, and an average pore size of 47.39 nm. The kaolin slurry and the red mud-ZSM-5 zeolite slurry were mixed together and stirred for 5 min to produce a red mud-zeolite-kaolin slurry. Separately, 100 g (dry basis) of Catapal B alumina was mixed with 194.92 g of distilled water to form an alumina slurry and peptized by adding 7.22 g of concentrated formic acid (70 wt. %) and stirred for 30 min. The peptized alumina slurry was added to the red mud-zeolite-kaolin slurry and blended for 10 min, producing a slurry with high viscosity where each component remained suspended. The resulting catalyst precursor slurry comprising 30% solids was spray dried to produce the composite particles having particle sizes of from 20 micrometers (μm) to 100 μm. The particles were then calcined at 550 °C for 6 hours to produce the hybrid catalyst. The hybrid catalyst had a total surface area of 124.14 $m^2/g$, a total pore volume of 0.172 $cm^3/g$, and an average pore size of 55.28 nm.

Catalyst Testing

A plastic derived oil produced from solid waste plastic was catalytically cracked according to an Advanced Cracking Evaluation (ACE) test procedure to show the products produced through catalytically cracking a plastic derived oil. The ACE tests were conducted using a micro-activity cracking testing (MAT) unit. The MAT unit and ACE testing process is described more in detail in U.S. Pat. No. 6,069,012.

Referring to FIG. 3, the MAT unit 200 used in these examples is schematically depicted. The MAT unit 200 includes a fluidized reactor 210 configured to simulate reaction in an FCC reactor. Fluidization gas 212 is introduced to the bottom of the fluidized reactor 210 to maintain the catalyst 204 in a fluidized state. The catalyst 204 is loaded into the fluidized reactor 210 from the catalyst hopper 206. The feed 202 is introduced to the top of the fluidized reactor 210 and flows downward into the catalyst 204 fluidized within the fluidized reactor 210. After contacting the feed 202 with the catalyst 204 in the reactor, the reaction effluent 216 is passed out of the fluidized reactor 210 to the product liquid receivers 220, which separate the liquid products from the gaseous products. The gaseous product stream 222 is passed to a product gas receiver 230. The composition of the gaseous product stream 222 is analyzed using a micro gas chromatograph 240 having a GC control unit 242. The catalyst 204 is regenerated by introducing a regeneration gas 214 into the bottom of the fluidized reactor 210. The flue gas is treated in a catalytic converter 260 and passed through a flow meter 262 and $CO_2$ analyzer 264 for quantifying the amount of coke produced during the reactions. The MAT unit 200 can include an ACE control system 270 for controlling operation of the MAT unit 200.

Examples 2-5: Hybrid Catalyst Testing

For Examples 2-5, the hybrid catalyst of Example 1 was subjected to ACE testing in the MAT unit as previously described. For the current examples, the ACE testing for the hybrid catalyst was performed using steam-deactivated hybrid catalyst. The hybrid catalysts were first deactivated under hydrothermal conditions (100% steam, 810 °C, 6 h) before being used for catalytic evaluations. The ACE testing was performed with a catalyst-to-oil weight ratio of 8 and an injection time of 75 seconds. The ACE testing of the hybrid catalyst in the MAT unit was conducted at temperatures of 550 °C, 575 °C, 600 °C, and 650 °C.

Prior to each experiment, the steam-deactivated hybrid catalyst was loaded into the reactor and heated to the desired reaction temperature. $N_2$ gas was fed through the feed injector from the bottom to keep the hybrid catalyst particles fluidized. Once the catalyst bed temperature reached within +2 °C of the reaction temperature, the reaction was started by injecting the feed (i.e., the plastic derived oil). For each evaluation, the feed was injected for a predetermined time (time-on-stream (TOS)) of 75 seconds. The desired catalyst-to-feed ratio was obtained by controlling the feed pump for the feed. The composition of the plastic derived oil stream, which was used as the feed for Examples 2-5, is provided in Table 2. The gaseous product was routed to the liquid receiver (220 in FIG. 3), where $C_5$+ hydrocarbons were condensed. The remaining product gases were routed to the gas receiver (230 in FIG. 3) in the product gas stream 222. The used hybrid catalyst in the reactor was then stripped with a stripping gas ($N_2$) to removing any residual liquid or gaseous products, reactants, or both from the hybrid catalyst. After catalyst stripping was completed, the reactor was heated to 700 °C, and air injected to regenerate the used hybrid catalyst to produce regenerated catalyst. During regeneration, the released gas was routed to a $CO_2$ analyzer (catalytic converter 260, flow meter 262 and $CO_2$ analyzer 264 in FIG. 3). Coke yield was calculated from the flue gas flow rate and $CO_2$ concentration.

The gaseous product stream 222 was analyzed by an online gas chromatography system (Agilent 7890 gas chromatograph) equipped with both FID and TCD detectors. The liquid product stream is analyzed according to the offline analytical test methods. In particular, the liquid product stream is analyzed by simulated distillation according to test method EN 15199-2 using the Agilent 7890 gas chromatograph and naphtha analysis techniques.

For the simulated distillation, the analysis was conducted for five distillation fractions: (1) light hydrocarbon gases having 1-4 carbon atoms; (2) a light naphtha fraction having a boiling point range of from 0 °C to 221 °C; (3) a jet fuel fraction having a boiling point range of from 150 °C to 300 °C; (4) a diesel fraction having boiling point temperatures of from 300 °C to 343 °C; and (5) a heavy compounds fraction having boiling point temperatures greater than 343 °C. The light hydrocarbon gases were further classified into fuel gas (hydrogen and methane), $C_2$-$C_4$ paraffins, ethylene (C2=), propylene (C3=), and mixed butenes (C4=). Coke was quantified after passing an air stream through the MAT unit at high temperatures to burn the coke into a mixture of carbon monoxide, carbon dioxide, and water, as previously discussed, and then passing the combustion gases through a $CO_2$ analyzer, which included a calibrated infrared analyzer. The composition of the plastic derived oil stream 102 used as the feed and the reaction products are provided in Table 2 and in FIG. 4.

The chloride concentration of the feed and the reaction products at 550 °C and 575 °C was also tested by x-ray fluorescence (XRF) spectrometry. The results are provided in FIG. 5.

TABLE 2

ACE Testing of Hybrid Catalyst of Examples 2-5

| Constituent | Plastic derived oil | 2 | 3 | 4 | 5 |
|---|---|---|---|---|---|
| Reaction Temperature (°C) | — | 550 | 575 | 600 | 650 |
| Catalyst | — | Example 1 | Example 1 | Example 1 | Example 1 |
| Fuel Gas (wt. %) | — | 1.21 | 1.24 | 1.85 | 4.77 |
| C2-C4 paraffin (wt. %) | — | 2.74 | 2.59 | 2.36 | 4.30 |
| Ethylene (wt. %) | — | 1.48 | 1.78 | 2.85 | 7.14 |
| Propylene (wt. %) | — | 7.79 | 8.75 | 10.19 | 13.91 |
| Butenes (wt. %) | — | 9.08 | 10.15 | 11.05 | 12.91 |
| Light Naphtha (wt. %) | 23.8 | 28.87 | 29.70 | 30.08 | 26.95 |
| Jet Fuel (wt. %) | 49.7 | 33.08 | 31.32 | 29.34 | 21.34 |
| Diesel (wt. %) | 15.2 | 8.07 | 7.35 | 5.99 | 3.19 |
| Heavy Compounds (wt. %) | 11.3 | 5.19 | 4.36 | 3.37 | 2.05 |
| Coke (wt. %) | — | 2.48 | 2.78 | 2.92 | 3.43 |

Figure 4:
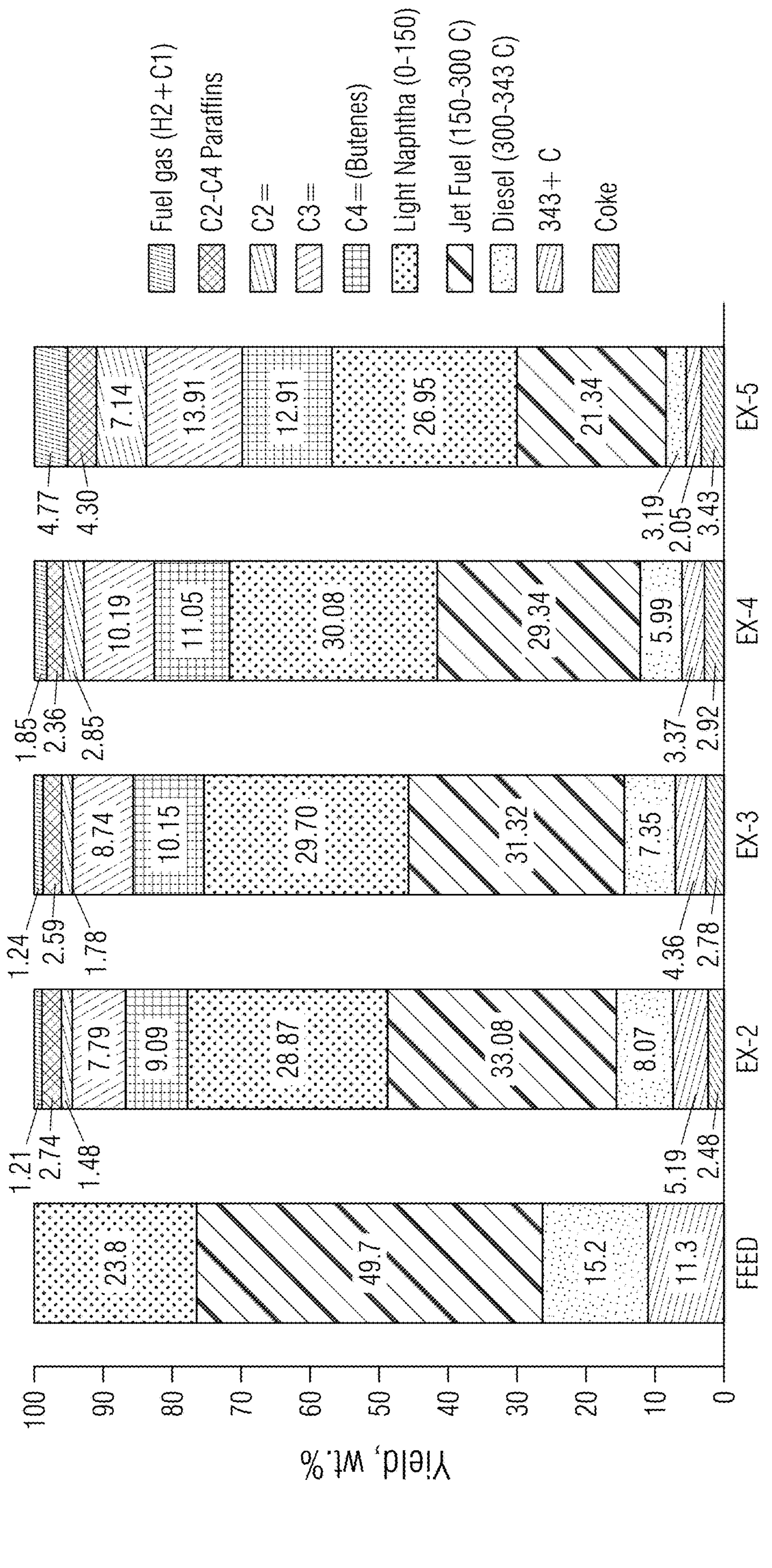
FIG. 4 graphically depicts a composition of the plastic derived oil stream and reaction effluents obtained from contacting the plastic derived oil stream with the hybrid catalyst at different reaction temperatures, according to embodiments shown and described in this disclosure.

Referring to FIG. 4 and Table 2, the plastic derived oil was shown to be a suitable feed for fluidized catalytic cracking, where the plastic derived oil can be converted to generate circular chemicals such as ethylene, propylene, and butenes, as well as low carbon footprint fuels (e.g., light naphtha). The reactor set up in this disclosure allows for the continuous decontamination and the catalytic cracking of plastic derived oil in a single step to generate circular chemicals and a halogen free low carbon footprint fuel.

As shown in FIG. 4 and Table 2, catalytic cracking of the plastic derived oil using the hybrid catalyst described herein results in at least 47.22 wt. % of ethylene, propylene, butenes, and light naphtha, as shown in Example 2. Catalytic cracking at 650 °C (Example 5) results in 60.61 wt. % of ethylene, propylene, butenes, and light naphtha in the total reaction products. The results show that the hybrid catalyst comprising red mud and ZSM-5 zeolite works as an effective catalyst for catalytic cracking of the plastic derived oil.

Figure 5:
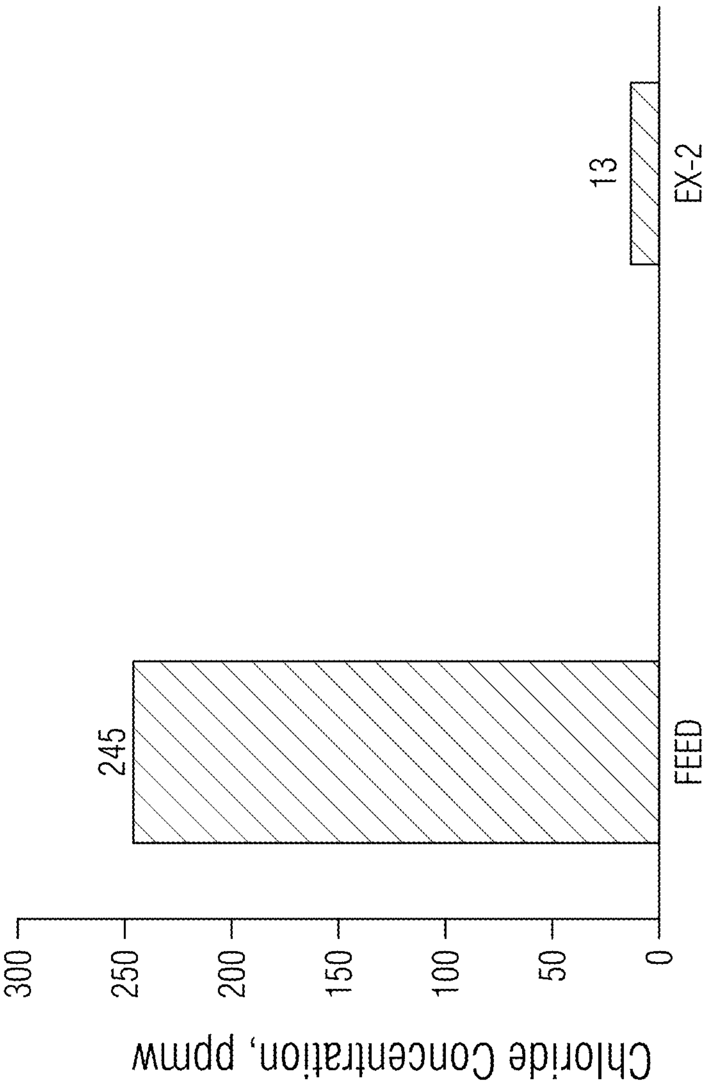
FIG. 5 graphically depicts chloride concentration of plastic derived oil and reaction effluent, according to embodiments shown and described in this disclosure.

Additionally, the hybrid catalyst comprising red mud and ZSM-5 zeolite works effectively to dehalogenate the plastic derived oil. As shown in FIG. 5, the plastic derived oil had a chloride content of 245 ppmw. After contact with the hybrid catalyst, the reaction products had a chloride content of 13 ppmw at 550 °C. The hybrid catalyst comprising red mud and ZSM-5 zeolite is effective at removing halogen-containing compounds, which may cause equipment corrosion or reduced efficiency of catalysts downstream, from the reaction products.

Comparative Examples 6-9: Red Mud Particles

For Comparative Examples 6-9, the plastic derived oil in Table 2 was contacted with red mud particles only in the MAT unit according to the ACE testing methods discussed above. The red mud particles were the same red mud particles used to make the hybrid catalyst of Example 1. The red mud particles were steam deactivated, as previously discussed, and then contacted with the plastic derived oil under the same sets of reaction conditions provided herein for Examples 2-5. The results for Comparative Examples CE-6 through CE-9 are provided in Table 3 and FIG. 6.

TABLE 3

ACE Testing of Red Mud Particles of Comparative Examples 5-9

| Example | Plastic derived oil | CE-6 | CE-7 | CE-8 | CE-9 |
|---|---|---|---|---|---|
| Reaction Temperature (°C) | — | 550 | 575 | 600 | 650 |
| Catalyst | — | Red Mud | Red Mud | Red Mud | Red Mud |
| Fuel Gas (wt. %) | — | 0.64 | 3.39 | 3.46 | 5.35 |
| C2-C4 paraffin (wt. %) | — | 2.56 | 4.83 | 4.03 | 5.18 |
| Ethylene (wt. %) | — | 1.26 | 4.74 | 6.57 | 9.87 |
| Propylene (wt. %) | — | 2.91 | 8.45 | 7.59 | 10.13 |
| Butenes (wt. %) | — | 3.19 | 9.46 | 7.07 | 8.35 |
| Light Naphtha (wt. %) | 23.8 | 48.00 | 20.74 | 39.30 | 31.36 |
| Jet Fuel (wt. %) | 49.7 | 15.51 | 20.78 | 15.44 | 15.62 |
| Diesel (wt. %) | 15.2 | 18.98 | 19.18 | 10.76 | 7.90 |
| Heavy Compounds (wt. %) | 11.3 | 4.05 | 4.72 | 2.32 | 1.78 |
| Coke (wt. %) | — | 2.91 | 3.71 | 3.46 | 4.45 |

Figure 6:
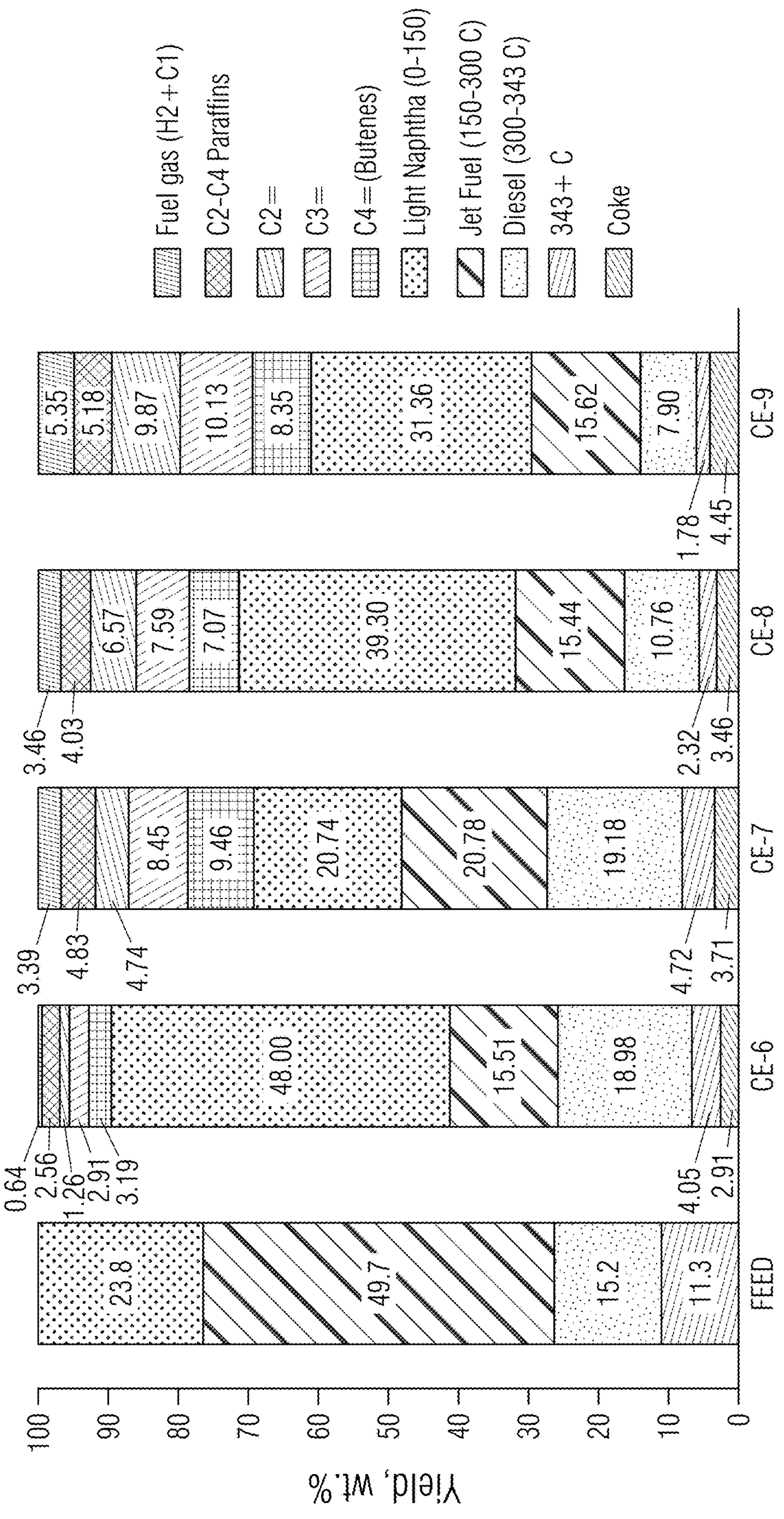
FIG. 6 graphically depicts a composition of the plastic derived oil stream and compositions of reaction effluents obtained from contacting the plastic derived oil stream with red mud particles only at different reaction temperatures, according to embodiments shown and described in this disclosure.

As shown in Table 3 and FIG. 6, contacting the plastic derived oil with the red mud particles at the reaction temperatures does accomplish some cracking at the reaction temperatures of from 550 °C to 650 °C to produce light olefins and light naphtha. However, as shown in Table 2 and FIG. 4, contacting with the hybrid catalyst comprising both the red mud particles and ZSM-5 zeolite particles produces greater yields of light olefins. Contacting with the hybrid catalyst also results in a lower combined yield of diesel and heavy compounds compared to contacting with the red mud particles.

A first aspect of the present disclosure is directed to a hybrid catalyst for simultaneous dehalogenation and cracking of plastic derived oil, the hybrid catalyst comprising a plurality of composite particles, wherein each of the composite particles comprises red mud particles and ZSM-5 zeolite particles.

A second aspect of the present disclosure may include the first aspect, wherein a catalyst weight ratio of the red mud particles to the ZSM-5 zeolite particles in the hybrid catalyst is from 0.1 to 1.

A third aspect of the present disclosure may include either one of the first or second aspects, wherein the composite particles comprise: from 1 wt. % to 20 wt. % red mud particles; and from 5 wt. % to 40 wt. % ZSM-5 zeolite particles.

A fourth aspect of the present disclosure may include any one of the first through third aspects, further comprising a matrix material and a binder.

A fifth aspect of the present disclosure may include the fourth aspect, further comprising: from 20 wt. % to 60 wt. % of the matrix material; and from 10 wt. % to 20 wt. % of the binder.

A sixth aspect of the present disclosure may include any one of the first through fifth aspects, wherein the red mud particles comprise $Fe_2O_3$, $Al_2O_3$, $TiO_2$, CaO, $SiO_2$, and $Na_2O$.

A seventh aspect of the present disclosure may include any one of the first through sixth aspects, wherein the red mud particles comprise: from 5 wt. % to 60 wt. % $Fe_2O_3$; from 5 wt. % to 30 wt. % $Al_2O_3$; from 0 wt. % to 15 wt. % $TiO_2$; from 2 wt. % to 14 wt. % CaO; from 3 wt. % to 50 wt. % $SiO_2$; and from 1 wt. % to 10 wt. % $Na_2O$ based on the total weight of the red mud.

An eighth aspect of the present disclosure may include any one of the first through seventh aspects, wherein a total surface area of the hybrid catalyst is from 110 $m^2/g$ to 140 $m^2/g$.

A ninth aspect of the present disclosure may include any one of the first through eighth aspects, wherein an average pore size of the hybrid catalyst is from 40 nm to 70 nm.

A tenth aspect of the present disclosure may include any one of the first through ninth aspects and may be directed to a process for upgrading plastic derived oil, the process comprising contacting the plastic derived oil with the hybrid catalyst of any one of the first through ninth aspects in an FCC reactor to produce an FCC effluent and a used hybrid catalyst, wherein: the FCC reactor is a fluidized bed reactor; the plastic derived oil comprises halogen-containing compounds; the contacting the plastic derived oil with the hybrid catalyst at reaction conditions causes at least a portion of the halogen-containing compounds to react to form hydrocarbons and hydrogen halides, where the hydrogen halides are adsorbed onto surfaces of the red mud particles; the contacting the plastic derived oil with the hybrid catalyst at reaction conditions causes hydrocarbons in the plastic derived oil to undergo cracking reactions to produce the FCC effluent; the FCC effluent has a concentration of the halogen-containing compounds less than a concentration of the halogen-containing compounds in the plastic derived oil; and the FCC effluent comprises light olefins, light naphtha, jet fuel constituents, and diesel constituents.

An eleventh aspect of the present disclosure may include the tenth aspect, where a catalyst weight ratio of the hybrid catalyst is from 0.1 to 1, where the catalyst weight ratio of the hybrid catalyst is equal to a mass of the red mud particles per unit mass of the hybrid catalyst divided by a mass of the ZSM-5 zeolite particles per unit mass of the hybrid catalyst.

A twelfth aspect of the present disclosure may include the eleventh aspect, further comprising determining a concentration of the halogen-containing compounds in the plastic derived oil and changing the catalyst weight ratio of the hybrid catalyst based on the concentration of the halogen-containing compounds in the plastic derived oil.

A thirteenth aspect of the present disclosure may include any one of the tenth through twelfth aspects, wherein the FCC effluent has a concentration of halogen-containing compounds of less than 100 ppmw.

A fourteenth aspect of the present disclosure may include any one of the tenth through thirteenth aspects, further comprising separating the FCC effluent into a plurality of product streams, wherein the plurality of product streams comprises a light olefins stream, a light naphtha stream, a jet fuel stream, a diesel stream, or combinations of these product streams.

A fifteenth aspect of the present disclosure may include any one of the tenth through fourteenth aspects, further comprising separating the used hybrid catalyst from the FCC effluent, regenerating the used hybrid catalyst in a catalyst regenerator to produce a regenerated hybrid catalyst, and passing the regenerated hybrid catalyst back to the FCC reactor.

A sixteenth aspect of the present disclosure may include the fifteenth aspect, where regenerating the used hybrid catalyst comprises contacting the used hybrid catalyst with a regeneration gas in the catalyst regenerator, where the regeneration gas is an oxygen-containing gas.

A seventeenth aspect of the present disclosure may include the sixteenth aspect, further comprising contacting the used hybrid catalyst with the regeneration gas at a regeneration temperature of from 500 °C to 800 °C.

An eighteenth aspect of the present disclosure may include the seventeenth aspect, where the contacting the used hybrid catalyst with the regeneration gas at the regeneration temperature causes reaction of metal halides on surfaces of the red mud particles to produce hydrogen halides, and causes coke deposits on the used hybrid catalyst to undergo oxidation, where oxidation of the coke deposits removes the coke deposits from the used hybrid catalyst to produce the regenerated hybrid catalyst, heats the regenerated hybrid catalyst, or both.

A nineteenth aspect of the present disclosure may include any one of the tenth through eighteenth aspects, wherein the FCC reactor operates at a pressure of from 101 kPa to 303 kPa and a temperature of from 500 °C to 650 °C.

A twentieth aspect of the present disclosure may include any one of the tenth through nineteenth aspects, wherein the FCC reactor has a catalyst-to-oil ratio of from 2 to 40.

A twenty-first aspect of the present disclosure may include the twentieth aspect, further comprising adjusting the catalyst-to-oil weight ratio in the FCC reactor based on a concentration of the halogen-containing compounds in the plastic derived oil.

A twenty-second aspect of the present disclosure may include the twenty-first aspect, wherein adjusting the catalyst-to-oil weight ratio in the FCC reactor comprises: determining a concentration of the halogen-containing compounds in the plastic derived oil; and adjusting a mass flow rate of the plastic derived oil to the FCC reactor, a mass flow rate of the hybrid catalyst to the FCC reactor, or both, where the catalyst-to-oil weight ratio is adjusted in proportion to the concentration of the halogen-containing compounds in the plastic derived oil.

A twenty-third aspect of the present disclosure may include any one of the tenth through twenty-second aspects, wherein the plastic derived oil comprises: from 20 wt. % to 35 wt. % light naphtha range hydrocarbons; from 40 wt. % to 70 wt. % jet fuel constituents; from 5 wt. % to 25 wt. % diesel range constituents; and from 5 wt. % to 25 wt. % heavy compounds.

A twenty-fourth aspect of the present disclosure may include any one of the tenth through twenty-third aspects, further comprising producing the plastic derived oil from solid waste plastic.

A twenty-fifth aspect of the present disclosure may include the twenty-fourth aspect, wherein producing the plastic derived oil from solid waste plastic comprises: melting the solid waste plastic to produce a liquefied plastic stream; subjecting the liquefied plastic stream to pyrolysis to produce the plastic derived oil.

A twenty-sixth aspect of the present disclosure may include any one of the first through ninth aspects and may be directed to a system for upgrading plastic derived oil, the system comprising: an FCC reactor containing the hybrid catalyst of any one of the first through ninth aspects, wherein the FCC reactor is a fluidized bed reactor configured to contact a plastic derived oil stream with the hybrid catalyst to produce an FCC effluent; a fluid-solid separation unit disposed at an outlet end of the FCC reactor, wherein the fluid-solid separation unit is configured to separate the FCC effluent from a used hybrid catalyst; and a catalyst regenerator disposed downstream of the fluid-solid separation unit, wherein the catalyst regenerator is configured to regenerate the used hybrid catalyst to produce a regenerated hybrid catalyst.

A twenty-seventh aspect of the present disclosure may include the twenty-sixth aspect, further comprising: a water wash unit disposed upstream of the FCC reactor, where the water wash unit is configured to contact the plastic derived oil stream with water to remove inorganic contaminants, polar contaminants, or both from the plastic derived oil to produce a washed plastic derived oil; and an adsorption unit disposed between the water wash unit and the FCC reactor, where the upstream adsorption unit is configured to contact the washed plastic derived oil with an adsorbent to remove at least a portion of the halogen-containing compounds from the washed plastic derived oil to produce a treated plastic derived oil.

A twenty-eighth aspect of the present disclosure may include either one of the twenty-sixth or twenty-seventh aspects, where the system further comprises the plastic derived oil stream comprising the plastic derived oil, where the plastic derived oil stream has a concentration of halogen-containing compounds of greater than or equal to 100 ppmw based on the total weight of the plastic derived oil stream.

A twenty-ninth aspect of the present disclosure may include any one of the twenty-sixth through twenty-eighth aspects, further comprising: a pyrolysis reactor upstream of the FCC reactor, where the pyrolysis reactor is configured to subject a liquefied plastic stream to pyrolysis to produce the plastic derived oil stream; and a dehalogenation reactor upstream of the pyrolysis reactor, where the dehalogenation reactor is configured to melt solid plastic waste to produce the liquefied plastic stream.

A thirtieth aspect of the present disclosure may include any one of the twenty-sixth through twenty-ninth aspects, wherein the FCC reactor is a riser reactor or a downer reactor.

A thirty-first aspect of the present disclosure may include any one of the twenty-sixth through thirtieth aspects, further comprising an effluent separation system disposed downstream of the FCC reactor, the effluent separation system configured to separate the FCC effluent to produce a plurality of product streams.

It is noted that any two quantitative values assigned to a property may constitute a range of that property, and all combinations of ranges formed from all stated quantitative values of a given property are contemplated in this disclosure.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific aspects, it is noted that the various details of such aspects should not be taken to imply that these details are essential components of the aspects. Rather, the claims appended hereto should be taken as the sole representation of the breadth of the present disclosure and the corresponding scope of the various aspects described in this disclosure. Further, it will be apparent that modifications and variations are possible without departing from the scope of the appended claims.

What is claimed is:

1. A hybrid catalyst for simultaneous dehalogenation and cracking of plastic derived oil, the hybrid catalyst comprising a plurality of composite particles, wherein each of the composite particles comprises red mud particles and ZSM-5 zeolite particles and further comprising a matrix material and a binder.

2. The hybrid catalyst of claim 1, wherein a catalyst weight ratio of the red mud particles to the ZSM-5 zeolite particles in the hybrid catalyst is from 0.1 to 1.

3. The hybrid catalyst of claim 1, wherein the composite particles comprise:

from 1 wt. % to 20 wt. % red mud particles; and from 5 wt. % to 40 wt. % ZSM-5 zeolite particles.

4. The hybrid catalyst of claim 1, further comprising:

from 20 wt. % to 60 wt. % of the matrix material; and from 10 wt. % to 20 wt. % of the binder.

5. The hybrid catalyst of claim 1, wherein the red mud particles comprise $Fe_2O_3$, $Al_2O_3$, $TiO_2$, CaO, $SiO_2$, and $Na_2O$.

6. The catalyst of claim 1, wherein the red mud particles comprise:

from 5 wt. % to 60 wt. % $Fe_2O_3$;

from 5 wt. % to 30 wt. % $Al_2O_3$;

from 0 wt. % to 15 wt. % $TiO_2$;

from 2 wt. % to 14 wt. % CaO;

from 3 wt. % to 50 wt. % $SiO_2$; and from 1 wt. % to 10 wt. % $Na_2O$ based on the total weight of the red mud.

7. The hybrid catalyst of claim 1, wherein a total surface area of the hybrid catalyst is from 110 $m^2/g$ to 140 $m^2/g$.

8. The hybrid catalyst of claim 1, wherein an average pore size of the hybrid catalyst is from 40 nm to 70 nm.

9. A process for upgrading plastic derived oil, the process comprising contacting the plastic derived oil with the hybrid catalyst of claim 1 in an FCC reactor to produce an FCC effluent and a used hybrid catalyst, wherein:

the FCC reactor is a fluidized bed reactor;

the plastic derived oil comprises halogen-containing compounds;

the contacting the plastic derived oil with the hybrid catalyst at reaction conditions causes at least a portion of the halogen-containing compounds to react to form hydrocarbons and hydrogen halides, where the hydrogen halides are adsorbed onto surfaces of the red mud particles;

the contacting the plastic derived oil with the hybrid catalyst at reaction conditions causes hydrocarbons in the plastic derived oil to undergo cracking reactions to produce the FCC effluent;

the FCC effluent has a concentration of the halogen-containing compounds less than a concentration of the halogen-containing compounds in the plastic derived oil; and the FCC effluent comprises light olefins, light naphtha, jet fuel constituents, and diesel constituents.

10. The process of claim 9, wherein the FCC effluent has a concentration of halogen-containing compounds of less than 100 ppmw.

11. The process of claim 9, wherein the FCC reactor operates at a pressure of from 101 kPa to 303 kPa and a temperature of from 500 °C to 650 °C.

12. The process of claim 9, wherein the FCC reactor has a catalyst-to-oil ratio of from 2 to 40.

13. The process of claim 9, wherein the plastic derived oil comprises:

from 20 wt. % to 35 wt. % light naphtha range hydrocarbons;

from 40 wt. % to 70 wt. % jet fuel constituents;

from 5 wt. % to 25 wt. % diesel range constituents; and from 5 wt. % to 25 wt. % heavy compounds.

14. The process of claim 9, further comprising producing the plastic derived oil from solid waste plastic.

15. The process of claim 14, wherein producing the plastic derived oil from solid waste plastic comprises:

melting the solid waste plastic to produce a liquefied plastic stream;

subjecting the liquefied plastic stream to pyrolysis to produce the plastic derived oil.

16. A system for upgrading plastic derived oil, the system comprising:

an FCC reactor containing the hybrid catalyst of claim 1, wherein the FCC reactor is a fluidized bed reactor configured to contact a plastic derived oil stream with the hybrid catalyst to produce an FCC effluent;

wherein a catalyst weight ratio of the red mud particles to the ZSM-5 zeolite particles in the hybrid catalyst is from 0.1 to 1;

a fluid-solid separation unit disposed at an outlet end of the FCC reactor, wherein the fluid-solid separation unit is configured to separate the FCC effluent from a used hybrid catalyst; and a catalyst regenerator disposed downstream of the fluid-solid separation unit, wherein the catalyst regenerator is configured to regenerate the used hybrid catalyst to produce a regenerated hybrid catalyst.

17. The system of claim 16, further comprising:

a water wash unit disposed upstream of the FCC reactor, where the water wash unit is configured to contact the plastic derived oil stream with water to remove inorganic contaminants, polar contaminants, or both from the plastic derived oil to produce a washed plastic derived oil; and an adsorption unit disposed between the water wash unit and the FCC reactor, where the upstream adsorption unit is configured to contact the washed plastic derived oil with an adsorbent to remove at least a portion of the halogen-containing compounds from the washed plastic derived oil to produce a treated plastic derived oil.

18. The system of claim 16, further comprising:

a pyrolysis reactor upstream of the FCC reactor, where the pyrolysis reactor is configured to subject a liquefied plastic stream to pyrolysis to produce the plastic derived oil stream; and a dehalogenation reactor upstream of the pyrolysis reactor, where the dehalogenation reactor is configured to melt solid plastic waste to produce the liquefied plastic stream.

19. The system of claim 16, wherein the FCC reactor is a riser reactor or a downer reactor.

* * * * *